United States Patent
Li et al.

(10) Patent No.: US 11,528,731 B2
(45) Date of Patent: Dec. 13, 2022

(54) COMMUNICATION METHOD AND COMMUNICATIONS APPARATUS

(71) Applicant: Huawei Technologies Co., Ltd., Shenzhen (CN)

(72) Inventors: Shengyu Li, Beijing (CN); Lei Guan, Beijing (CN); Bingzhao Li, Beijing (CN); Yongxia Lyu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 123 days.

(21) Appl. No.: 17/094,516

(22) Filed: Nov. 10, 2020

(65) Prior Publication Data
US 2021/0058952 A1 Feb. 25, 2021

Related U.S. Application Data

(63) Continuation of application No. PCT/CN2019/086099, filed on May 9, 2019.

(30) Foreign Application Priority Data

May 11, 2018 (CN) .......................... 201810450854.8

(51) Int. Cl.
*H04W 72/12* (2009.01)
*H04L 1/00* (2006.01)
(Continued)

(52) U.S. Cl.
CPC ....... *H04W 72/1268* (2013.01); *H04L 1/0003* (2013.01); *H04L 1/1896* (2013.01); *H04L 5/0053* (2013.01); *H04W 72/14* (2013.01)

(58) Field of Classification Search
CPC .......................... H04W 72/1268; H04W 72/14; H04L 1/0003; H04L 1/1896; H04L 5/0053;
(Continued)

(56) References Cited

U.S. PATENT DOCUMENTS

2010/0118796 A1* 5/2010 Yi .......................... H04W 72/10
370/329
2019/0373560 A1* 12/2019 Ouchi ................. H04W 72/042
(Continued)

FOREIGN PATENT DOCUMENTS

CN 101771649 A 7/2010
CN 103916865 A 7/2014
(Continued)

OTHER PUBLICATIONS

"Discussion on Handling UL Multiplexing of Transmissions with Different Reliability Requirements," Source: vivo, Agenda Item: 7.2.4, Document for: Discussion and Decision, 3GPP TSG RAN WG1 Meeting #92, R1-1801550, Athens, Greece, Feb. 26-Mar. 2, 2018, 5 pages.
(Continued)

*Primary Examiner* — Sai Aung
*Assistant Examiner* — Wilfred Thomas
(74) *Attorney, Agent, or Firm* — Slater Matsil, LLP

(57) ABSTRACT

A communication method and a communications apparatus, the method including determining a first determining result when a first physical uplink channel and a second physical uplink channel overlap in time domain, where the first determining result includes a determining result about whether first data is intended to be sent, the first physical uplink channel includes a dynamic grant physical uplink channel, and the second physical uplink channel includes a configured grant physical uplink channel, and determining, in the first physical uplink channel and the second physical uplink channel based on the first determining result, a target physical uplink channel that is intended to be sent.

20 Claims, 7 Drawing Sheets

(51) Int. Cl.
*H04L 1/18* (2006.01)
*H04L 5/00* (2006.01)
*H04W 72/14* (2009.01)

(58) Field of Classification Search
CPC ....... H04L 1/08; H04L 1/1887; H04L 5/0042; H04L 5/0087; H04L 5/0064; H04L 5/0091; H04L 5/0044
See application file for complete search history.

(56) References Cited

U.S. PATENT DOCUMENTS

| | | | |
|---|---|---|---|
| 2020/0015217 A1* | 1/2020 | Feng | H04L 5/003 |
| 2020/0053749 A1* | 2/2020 | Liu | H04W 72/1289 |
| 2020/0059345 A1* | 2/2020 | Pelletier | H04L 5/0055 |
| 2020/0169356 A1* | 5/2020 | Wang | H04W 28/10 |
| 2020/0404648 A1* | 12/2020 | Kim | H04L 5/0048 |
| 2021/0160024 A1* | 5/2021 | Gao | H04L 27/2678 |
| 2021/0168649 A1* | 6/2021 | Turtinen | H04W 28/06 |
| 2021/0282169 A1* | 9/2021 | Zhang | H04W 72/1268 |
| 2021/0377937 A1* | 12/2021 | Takeda | H04L 1/1812 |

FOREIGN PATENT DOCUMENTS

| | | |
|---|---|---|
| CN | 104604318 A | 5/2015 |
| CN | 106455103 A | 2/2017 |
| CN | 107409370 A | 11/2017 |
| EP | 0436991 A1 | 7/1991 |
| EP | 3244682 A1 | 11/2017 |
| WO | 2019137116 A1 | 7/2019 |

OTHER PUBLICATIONS

"Discussion on Collision Handling for UL URLLC Transmission," Agenda item: 7.2.4, Source: CMCC, Document for: Discussion and Decision, 3GPP TSG RAN WG1 Meeting #92, R1-1802046, Athens, Greece, Feb. 26-Mar. 2, 2018, 3 pages.

"Prioritization Between Dynamic Grant and Configured Grant," Agenda item: 10.3.1.8, Source: Nokia, Nokia Shanghai Bell, Document for: Discussion and Decision, 3GPP TSG-RAN WG2 NR Ad hoc 1801, R2-1800586, Vancouver, Canada, Jan. 22-26, 2018, 3 pages.

* cited by examiner

COMMUNICATION METHOD AND COMMUNICATIONS APPARATUS

CROSS-REFERENCE TO RELATED APPLICATIONS

This application is a continuation of International Patent Application No. PCT/CN2019/086099, filed on May 9, 2019, which claims priority to Chinese Patent Application No. 201810450854.8, filed on May 11, 2018. The disclosures of the aforementioned applications are hereby incorporated by reference in their entireties.

TECHNICAL FIELD

Embodiments of this application relate to the communications field, and more specifically, to a communication method and a communications apparatus.

BACKGROUND

With development of communications technologies, a service having a relatively high transmission latency requirement such as an ultra-reliable low-latency communication (URLLC) service emerges.

To meet the transmission latency requirement of the foregoing service, data of the service may be sent on a grant-free physical uplink channel.

Therefore, there may be a case in which a grant-based physical uplink channel and the grant-free physical uplink channel overlap in time domain.

Currently, a processing manner for the foregoing case is Sending of the grant-based physical uplink channel is stipulated in a communication system, or sending of the grant-free physical uplink channel is stipulated in the communication system.

Regardless of the foregoing processing manner, communication flexibility is affected.

SUMMARY

This application provides a communication method and a communications apparatus, to improve communication flexibility.

According to a first aspect, a communication method is provided. The communication method includes determining a first determining result when a first physical uplink channel and a second physical uplink channel overlap in time domain, where the first determining result includes a determining result about whether first data is intended to be sent, the first physical uplink channel includes a dynamic grant physical uplink channel, and the second physical uplink channel includes a configured grant physical uplink channel, and determining, in the first physical uplink channel and the second physical uplink channel based on the first determining result, a target physical uplink channel that is intended to be sent.

According to the communication method in this application, a channel that is intended to be sent is determined in a grant-based physical uplink channel and a grant-free physical uplink channel depending on whether the first data is intended to be sent, so that a case in which no data is intended to be sent on a selected channel can be avoided, quick and reliable sending of the first data can be reliably ensured, and impact on sending of other data can be reduced. In this way, communication flexibility can be improved.

Optionally, the first data includes ultra-reliable low-latency communication URLLC data.

Optionally, the first data includes data that meets a preset quality of service (QoS) requirement and that is in a higher layer data flow arriving at a media access control (MAC) layer.

Optionally, the first data includes data on a first logical channel.

Optionally, the first logical channel is used to send the URLLC data.

Optionally, the first logical channel is indicated by a network device by using higher layer signaling.

Optionally, the first logical channel is predefined in a communications protocol.

Optionally, a configured Grant Type 1 Allowed parameter of the first logical channel is present.

Optionally, a value of a parameter of configuredGrantType1Allowed of the first logical channel is 1.

Optionally, the method further includes stopping sending of a non-target physical uplink channel.

The non-target physical uplink channel is either of the first physical uplink channel and the second physical uplink channel, that is not determined as the target physical uplink channel.

Optionally, the stopping sending of a non-target physical uplink channel may be understood as If logical channel prioritization (LCP) processing has not been started for the non-target physical uplink channel, or packet assembly into a MAC layer packet data unit (PDU) has not been started for the non-target physical uplink channel, or packet assembly into a corresponding MAC PDU has not been completed at the media access control (MAC) layer, a MAC layer entity stops or interrupts the LCP processing or the MAC PDU packet assembly for the non-target physical uplink channel, to be specific, the MAC layer entity neither completes the packet assembly performed for the non-target physical uplink channel, nor instructs a physical (PHY) layer entity to send the non-target physical uplink channel.

Optionally, the stopping sending of a non-target physical uplink channel may be understood as If a PHY layer entity has received a MAC PDU for the non-target physical uplink channel from the MAC layer, but has not sent the non-target physical uplink channel, the PHY layer entity stops or cancels sending of the non-target physical uplink channel at the physical layer.

Optionally, the stopping sending of a non-target physical uplink channel may be understood as If a PHY layer entity has received a MAC PDU for the non-target physical uplink channel from the MAC layer, and has started to send the non-target physical uplink channel, sending of the non-target physical uplink channel is stopped or interrupted at the PHY layer.

Optionally, the determining, in the first physical uplink channel and the second physical uplink channel based on the first determining result, a target physical uplink channel that is intended to be sent includes if the first determining result is no, determining the first physical uplink channel as the target physical uplink channel.

Therefore, when the first data does not arrive, a case in which the grant-based physical uplink channel cannot be sent is avoided, so that enhanced mobile broadband (eMBB) data can be sent only on the grant-free physical uplink channel. However, the grant-free physical uplink channel may fail to carry the eMBB data, or transmission spectral efficiency is low even if the grant-free physical uplink channel can carry the eMBB data, greatly affecting transmission of the eMBB data.

Optionally, if the first determining result is yes, the second physical uplink channel is determined as the target physical uplink channel, and the first data is sent on the second physical uplink channel.

Optionally, if the first determining result is yes, the first physical uplink channel is determined as the target physical uplink channel, and the first data is sent on the first physical uplink channel.

Therefore, when the first data arrives, timely sending of the first data can be ensured.

Optionally, the determining, in the first physical uplink channel and the second physical uplink channel based on the first determining result, a target physical uplink channel that is intended to be sent includes determining the target physical uplink channel in the first physical uplink channel and the second physical uplink channel based on the first determining result and a second determining result.

Optionally, the second determining result includes a determining result about whether LCP processing has been started for the first physical uplink channel at the MAC layer.

Optionally, the second determining result includes a determining result about whether packet assembly into a MAC PDU corresponding to the first physical uplink channel has been started at the MAC layer.

Optionally, the second determining result includes a determining result about whether packet assembly into a MAC PDU corresponding to the first physical uplink channel has been completed.

Optionally, the second determining result includes a determining result about whether the first physical uplink channel has started to be sent at the PHY layer.

Optionally, the second determining result includes a determining result about whether a time interval between a moment of obtaining the first determining result and a start moment of the first physical uplink channel is less than a preset time threshold.

Optionally, the time threshold is stipulated in a communications system or a communications protocol.

Alternatively, the time threshold is determined by the network device and indicated to a terminal device.

Optionally, the determining the target physical uplink channel in the first physical uplink channel and the second physical uplink channel based on the first determining result and a second determining result includes if the first determining result is yes, and the second determining result is yes, using the second physical uplink channel as the target physical uplink channel.

Therefore, after the first physical uplink channel starts to be processed or sent, user equipment (UE) finds that the first data cannot be carried on the first physical uplink channel in time. Therefore, the second physical channel is processed at the MAC layer, the first data is carried on the second physical channel, and the second physical channel is sent at the PHY layer, to ensure the quick and reliable sending of the first data.

Optionally, the determining the target physical uplink channel in the first physical uplink channel and the second physical uplink channel based on the first determining result and a second determining result includes if the first determining result is yes, and the second determining result is no, using either the first physical uplink channel or the second physical uplink channel as the target physical uplink channel.

Optionally, the determining the target physical uplink channel in the first physical uplink channel and the second physical uplink channel based on the first determining result and a second determining result includes determining the target physical uplink channel in the first physical uplink channel and the second physical uplink channel based on the first determining result, the second determining result, and a time length of the first physical uplink channel.

Optionally, the determining the target physical uplink channel in the first physical uplink channel and the second physical uplink channel based on the first determining result, the second determining result, and a time length of the first physical uplink channel includes if the first determining result is yes, the second determining result is no, and the time length of the first physical uplink channel is less than or equal to a first threshold, determining the first physical uplink channel as the target physical uplink channel.

Optionally, the determining the target physical uplink channel in the first physical uplink channel and the second physical uplink channel based on the first determining result and a second determining result includes if the first determining result is yes, and the second determining result is no, determining the target physical uplink channel in the first physical uplink channel and the second physical uplink channel based on a time length of the first physical uplink channel.

Optionally, the determining the target physical uplink channel in the first physical uplink channel and the second physical uplink channel based on the first determining result and a second determining result includes if the first determining result is yes, and the second determining result is no, determining the target physical uplink channel in the first physical uplink channel and the second physical uplink channel based on a time length of the first physical uplink channel and a modulation and coding scheme (MCS) of the first physical uplink channel.

Optionally, the determining the target physical uplink channel in the first physical uplink channel and the second physical uplink channel based on the first determining result and a second determining result includes if the first determining result is yes, and the second determining result is no, determining the target physical uplink channel in the first physical uplink channel and the second physical uplink channel based on a time length of the first physical uplink channel, an MCS of the first physical uplink channel, and a transport block size (TBS) of the first physical uplink channel.

Optionally, the determining, in the first physical uplink channel and the second physical uplink channel based on the first determining result, a target physical uplink channel that is intended to be sent includes determining the target physical uplink channel in the first physical uplink channel and the second physical uplink channel based on the first determining result and the time length of the first physical uplink channel.

Optionally, the determining the target physical uplink channel in the first physical uplink channel and the second physical uplink channel based on the first determining result and the time length of the first physical uplink channel includes if the first determining result is yes, and the time length of the first physical uplink channel is less than or equal to the first threshold, determining the first physical uplink channel as the target physical uplink channel.

Optionally, the determining the target physical uplink channel in the first physical uplink channel and the second physical uplink channel based on the first determining result and the time length of the first physical uplink channel includes if the first determining result is yes, and the time length of the first physical uplink channel is greater than the first threshold, determining the second physical uplink channel as the target physical uplink channel.

Optionally, the first threshold is determined based on a time length of the second physical uplink channel.

Optionally, the first threshold is the same as a value of the time length of the second physical uplink channel.

Optionally, the determining the target physical uplink channel in the first physical uplink channel and the second physical uplink channel based on the first determining result and the time length of the first physical uplink channel includes determining the target physical uplink channel in the first physical uplink channel and the second physical uplink channel based on the first determining result, the time length of the first physical uplink channel, and the modulation and coding scheme (MCS) of the first physical uplink channel.

Optionally, the determining the target physical uplink channel in the first physical uplink channel and the second physical uplink channel based on the first determining result, the time length of the first physical uplink channel, and the modulation and coding scheme (MCS) of the first physical uplink channel includes if the first determining result is yes, the time length of the first physical uplink channel is less than or equal to the first threshold, and spectral efficiency (SE) corresponding to the MCS of the first physical uplink channel is less than or equal to a second threshold, determining the first physical uplink channel as the target physical uplink channel.

Optionally, the determining the target physical uplink channel in the first physical uplink channel and the second physical uplink channel based on the first determining result, the time length of the first physical uplink channel, and the modulation and coding scheme (MCS) of the first physical uplink channel includes if the first determining result is yes, the time length of the first physical uplink channel is less than or equal to the first threshold, and spectral efficiency (SE) corresponding to the MCS of the first physical uplink channel is greater than a second threshold, determining the second physical uplink channel as the target physical uplink channel.

Optionally, the determining the target physical uplink channel in the first physical uplink channel and the second physical uplink channel based on the first determining result includes determining the target physical uplink channel in the first physical uplink channel and the second physical uplink channel based on the first determining result and the modulation and coding scheme (MCS) of the first physical uplink channel.

Optionally, the determining the target physical uplink channel in the first physical uplink channel and the second physical uplink channel based on the first determining result and the modulation and coding scheme (MCS) of the first physical uplink channel includes if the first determining result is yes, and the spectral efficiency (SE) corresponding to the MCS of the first physical uplink channel is less than or equal to the second threshold, determining the first physical uplink channel as the target physical uplink channel.

Optionally, the determining the target physical uplink channel in the first physical uplink channel and the second physical uplink channel based on the first determining result and the modulation and coding scheme (MCS) of the first physical uplink channel includes if the first determining result is yes, and the spectral efficiency (SE) corresponding to the MCS of the first physical uplink channel is greater than the second threshold, determining the second physical uplink channel as the target physical uplink channel.

Optionally, the second threshold is determined based on SE corresponding to an MCS of the second physical uplink channel.

Optionally, the second threshold is the same as a value of the SE corresponding to the MCS of the second physical uplink channel.

Optionally, the determining the target physical uplink channel in the first physical uplink channel and the second physical uplink channel based on the first determining result and the modulation and coding scheme (MCS) of the first physical uplink channel includes if the first determining result is yes, and an index of the MCS of the first physical uplink channel is less than or equal to a third threshold, determining the first physical uplink channel as the target physical uplink channel.

Optionally, the determining the target physical uplink channel in the first physical uplink channel and the second physical uplink channel based on the first determining result and the modulation and coding scheme (MCS) of the first physical uplink channel includes if the first determining result is yes, and an index of the MCS of the first physical uplink channel is greater than a third threshold, determining the second physical uplink channel as the target physical uplink channel.

Optionally, the third threshold is determined based on an index of an MCS of the second physical uplink channel.

Optionally, the third threshold is the same as a value of the index of the MCS of the second physical uplink channel.

Optionally, the determining the target physical uplink channel in the first physical uplink channel and the second physical uplink channel based on the first determining result includes determining the target physical uplink channel in the first physical uplink channel and the second physical uplink channel based on the first determining result and the transport block size (TBS) of the first physical uplink channel.

Optionally, the determining the target physical uplink channel in the first physical uplink channel and the second physical uplink channel based on the first determining result and the TBS of the first physical uplink channel includes if the first determining result is yes, and the TBS of the first physical uplink channel is greater than or equal to a fourth threshold, determining the first physical uplink channel as the target physical uplink channel.

Optionally, the determining the target physical uplink channel in the first physical uplink channel and the second physical uplink channel based on the first determining result and the TBS of the first physical uplink channel includes if the first determining result is yes, and the TBS of the first physical uplink channel is less than a fourth threshold, determining the second physical uplink channel as the target physical uplink channel.

Optionally, the fourth threshold is determined based on a TBS of the second physical uplink channel.

Optionally, the fourth threshold is the same as a value of the TBS of the second physical uplink channel.

Optionally, when the first determining result is no, and a maximum amount of data that can be carried on the first physical uplink channel is less than an amount of to-be-sent data, the first physical uplink channel is determined as the target physical uplink channel, and the sending of the non-target physical uplink channel is stopped.

Optionally, the to-be-sent data is eMBB data.

Therefore, transmission efficiency of the eMBB data can be improved.

According to a second aspect, a communication method is provided. The communication method includes when first data arrives, if a first physical uplink channel and a second physical uplink channel overlap in time domain, processing the first data at a media access control (MAC) layer based on the second physical uplink channel, to generate a first data packet that is intended to be sent on the second physical uplink channel, where the first physical uplink channel includes a dynamic grant physical uplink channel, and the second physical uplink channel includes a configured grant physical uplink channel, and sending the first data packet at the MAC layer to a physical layer, and indicating a physical layer entity to send the first data packet on the second physical uplink channel.

Optionally, the first data includes ultra-reliable low-latency communication URLLC data.

Optionally, the first data includes data on a first logical channel.

Optionally, the first data includes data that meets a preset QoS requirement and that is in a higher layer data flow arriving at a MAC layer.

Optionally, the first logical channel is used to send the URLLC data.

Optionally, the first logical channel is indicated by a network device by using higher layer signaling.

Optionally, the first logical channel is predefined in a communications protocol.

Optionally, a parameter of configuredGrantType1Allowed of the first logical channel is present.

Optionally, a value of a parameter of configuredGrantType1Allowed of the first logical channel is 1.

According to a third aspect, a communication method is provided. The communication method includes receiving, at a physical layer, a first data packet from a media access control (MAC) layer, and determining, according to an instruction of the MAC layer, to send the first data packet on a second physical uplink channel, and if a first physical uplink channel and the second physical uplink channel overlap in time domain, stopping sending of the first physical uplink channel, and sending the second physical uplink channel at the physical layer, where the first physical uplink channel includes a dynamic grant physical uplink channel, and the second physical uplink channel includes a configured grant physical uplink channel.

Optionally, the first data includes ultra-reliable low-latency communication URLLC data.

Optionally, the first data includes data on a first logical channel.

Optionally, the first data includes data that meets a preset QoS requirement and that is in a higher layer data flow arriving at the MAC layer.

Optionally, the first logical channel is used to send the URLLC data.

Optionally, the first logical channel is indicated by a network device by using higher layer signaling.

Optionally, the first logical channel is predefined in a communications protocol.

Optionally, a parameter of configuredGrantType1Allowed of the first logical channel is present.

According to a fourth aspect, a communication method is provided. The communication method includes when first data arrives, if a first physical uplink channel and a second physical uplink channel overlap in time domain, processing the first data at a media access control (MAC) layer based on the second physical uplink channel, to generate a first data packet that is intended to be sent on the second physical uplink channel, where the first physical uplink channel includes a dynamic grant physical uplink channel, and the second physical uplink channel includes a configured grant physical uplink channel, and stopping sending of the first physical uplink channel, and sending the second physical uplink channel at a physical layer.

Optionally, the first data includes ultra-reliable low-latency communication URLLC data.

Optionally, the first data includes data that meets a preset QoS requirement and that is in a higher layer data flow.

Optionally, the first data includes data on a first logical channel.

Optionally, the first logical channel is used to send the URLLC data.

Optionally, the first logical channel is indicated by a network device by using higher layer signaling.

Optionally, the first logical channel is predefined in a communications protocol.

Optionally, a parameter of configuredGrantType1Allowed of the first logical channel is present.

According to a fifth aspect, a communication method is provided. The communication method includes sequentially processing a plurality of pieces of data at a media access control (MAC) layer in an arrival order, to generate a data packet corresponding to each piece of data, where the plurality of pieces of data include data that is intended to be sent on a first physical uplink channel and data that is intended to be sent on a second physical uplink channel, the first physical uplink channel includes a dynamic grant physical uplink channel, and the second physical uplink channel includes a configured grant physical uplink channel, and if the first physical uplink channel and the second physical uplink channel overlap in time domain, stopping sending of the first physical uplink channel, and sending the second physical uplink channel at a physical layer.

According to the prior art, if a grant-based physical uplink channel and a grant-free physical uplink channel overlap, processing of data that is intended to be sent on the grant-free physical uplink channel is stopped at the MAC layer, affecting transmission of the data. In contrast, in this application, if the grant-based physical uplink channel and the grant-free physical uplink channel overlap, each piece of data is processed at the MAC layer in the arrival order, and the second physical uplink channel is preferentially sent (to be specific, the first physical uplink channel is stopped or interrupted, and the second physical uplink channel is sent) at the physical layer, so that quick and reliable transmission of the URLLC data can be ensured.

According to a sixth aspect, a communications apparatus is provided. The communications apparatus includes units configured to perform the steps in the communication method according to any one of the first aspect to the fifth aspect or the implementations of the first aspect to the fifth aspect.

In a design, the communications apparatus is a communications chip. The communications chip may include an input circuit or interface configured to receive information or data, and an output circuit or interface configured to send information or data.

In another design, the communications apparatus is a communications device (for example, a terminal device). A communications chip may include a transmitter configured to send information or data, and a receiver configured to receive information or data.

According to a seventh aspect, a communications device is provided. The communications device includes a processor and a memory. The memory is configured to store a computer program. The processor is configured to invoke the computer program from the memory and run the computer program, so that the communications device performs the communication method according to any one of the first aspect to the fifth aspect or the implementations of the first aspect to the fifth aspect.

Optionally, there are one or more processors and one or more memories.

Optionally, the memory may be integrated into the processor, or the memory and the processor are separately disposed.

Optionally, the communications device further includes a transmitter and a receiver.

According to an eighth aspect, a computer program product is provided. The computer program product includes a computer program (which may also be referred to as code or an instruction). When the computer program is run, a computer is enabled to perform the communication method according to any one of the first aspect to the fifth aspect or the implementations of the first aspect to the fifth aspect.

According to a ninth aspect, a computer-readable medium is provided. The computer-readable medium stores a computer program (which may also be referred to as code or an instruction). When the computer program is run on a computer, the computer is enabled to perform the communication method according to any one of the first aspect to the fifth aspect or the implementations of the first aspect to the fifth aspect.

According to a tenth aspect, a chip system is provided. The chip system includes a memory and a processor. The memory is configured to store a computer program, and the processor is configured to invoke the computer program from the memory and run the computer program, so that a communications device on which the chip system is installed performs the communication method according to any one of the first aspect to the fifth aspect or the implementations of the first aspect to the fifth aspect.

The chip system may include an input circuit or interface configured to receive information or data, and an output circuit or interface configured to send information or data.

According to an eleventh aspect, a communications system is provided. The communications system includes a terminal device and a network device. The terminal device is configured to perform the communication method according to any one of the first aspect or the implementations of the first aspect. The network device is configured to receive a target physical uplink channel determined by the terminal device in a first physical uplink channel and a second physical uplink channel, where the first physical uplink channel and the second physical uplink channel overlap in time domain, the first physical uplink channel includes a dynamic grant physical uplink channel, and the second physical uplink channel includes a configured grant physical uplink channel.

According to a twelfth aspect, a communications system is provided. The communications system includes a terminal device and a network device. The terminal device is configured to perform the communication method according to any one of the second aspect to the fifth aspect or the implementations of the second aspect to the fifth aspect. The network device is configured to receive a second physical uplink channel sent by the terminal device, where the second physical uplink channel includes a configured grant physical uplink channel, a first physical uplink channel and the second physical uplink channel overlap in time domain, and the first physical uplink channel includes a dynamic grant physical uplink channel.

According to the communication method in this application, the channel that is intended to be sent is determined in the grant-based physical uplink channel and the grant-free physical uplink channel depending on whether the first data is intended to be sent, so that the case in which no data is intended to be sent on the selected channel can be avoided, and the sending of the first data can be reliably determined. Therefore, the communication flexibility can be improved, and transmission reliability of the first data can be improved.

DETAILED DESCRIPTION OF ILLUSTRATIVE EMBODIMENTS

Figure 1:
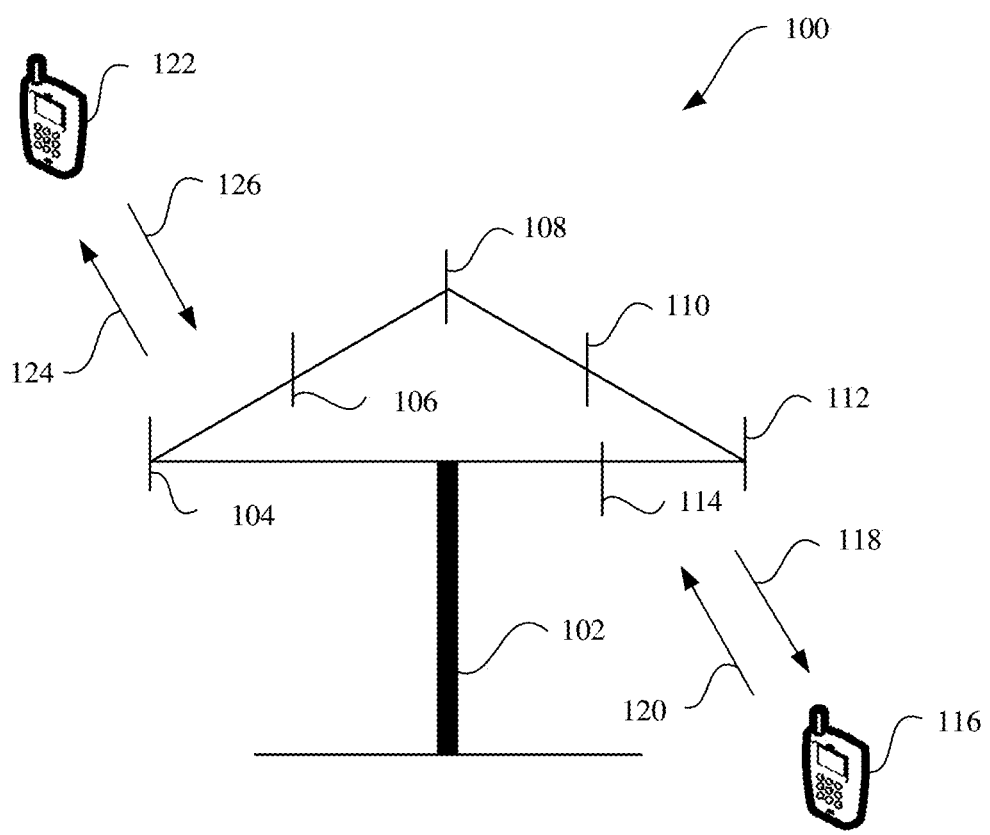
FIG. 1 is a schematic architectural diagram of a communications system according to this application.

The following describes the technical solutions of this application with reference to the accompanying drawings.

The technical solutions of the embodiments of this application may be applied to various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a 5th generation (5G) system or new radio (NR) system.

By way of example rather than limitation, a terminal device in the embodiments of this application may also be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The terminal device may be a station (ST) in a WLAN, or may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, or a next-generation communications system, for example, a terminal device in a 5G network, or a terminal device in a future evolved public land mobile network (PLMN).

By way of example rather than limitation, the terminal device in the embodiments of this application may alternatively be a wearable device. The wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that can be directly worn on a human body or integrated into clothes or an accessory of a user. The wearable device is not merely a hardware device, but is configured to implement a powerful function through software support, data exchange, and cloud interaction. Generalized wearable intelligent devices include full-featured and large-size devices, such as smart watches or smart glasses, that can implement complete or partial functions without depending on smartphones, and devices, such as various smart bands or smart jewelry for monitoring physical signs, that focus on only one type of application function and need to work with other devices such as smartphones.

In addition, in the embodiments of this application, the terminal device may alternatively be a terminal device in an internet of things (IoT) system. The IoT is an important component in development of future information technologies. A main technical feature of the IoT is to connect an object to a network through a communications technology, to implement an intelligent network of human-thing interconnection and thing-thing interconnection.

In the embodiments of this application, an IoT technology may implement massive connections, deep coverage, and terminal power saving through, for example, a narrowband NB technology. For example, NB includes only one resource block (RB). In other words, a bandwidth of NB is only 180 KB/s. To implement massive connection, terminals are required to be discrete in access. According to a communication method in the embodiments of this application, a congestion problem that occurs when massive terminals access a network through the NB in an IoT application scenario can be effectively resolved.

In addition, in this application, the terminal device may alternatively include a sensor such as an intelligent printer, a train detector, or a gas station, and main functions of the terminal device include collecting data (for some terminal devices), receiving control information and downlink data from a network device, sending an electromagnetic wave, and sending uplink data to the network device.

The network device may be a device, such as an access network device, configured to communicate with a mobile device. By way of example rather than limitation, in this application, the network device may be an access point (AP) in a WLAN, a base transceiver station (BTS) in GSM or CDMA, a NodeB (NB) in WCDMA, a gNB in the new radio (NR) system, an evolved NodeB (Evolved Node B, eNB or eNodeB) in LTE, a relay station or an access point, a vehicle-mounted device, a wearable device, an access network device in the 5G network, an access network device in the future evolved PLMN, or the like.

In addition, in the embodiments of this application, the access network device serves a cell, and the terminal device communicates with the access network device on a transmission resource (for example, a frequency domain resource, namely, a spectrum resource) used for the cell. The cell may be a cell corresponding to the access network device (for example, a base station), and the cell may belong to a macro base station or a base station corresponding to a small cell (Small cell). The small cell herein may include a metro cell, a micro cell), a pico cell, a femto cell, or the like. These small cells have features of small coverage and low transmit power, and are suitable for providing a high-rate data transmission service.

In addition, a plurality of cells may work at the same time in a same frequency band on a carrier in the LTE system or the 5G system. In some special scenarios, the concept of the carrier is considered equivalent to that of the cell. For example, in a carrier aggregation (CA) scenario, when a secondary carrier is configured for UE, both a carrier index of the secondary carrier and a cell identification (Cell ID) of a secondary cell working on the secondary carrier are carried. In this case, it may be considered that the concept of the carrier is equivalent to that of the cell. For example, that the UE accesses a carrier is equivalent to that the UE accesses a cell.

A core network device may be connected to a plurality of access network devices, and configured to control the access network devices, and can distribute, to the access network devices, data received from a network side (for example, the internet).

In addition, in this application, the network device may include a gNB, for example, a macro base station, a micro base station, an indoor hotspot, or a relay node, and has functions of sending a radio wave to the terminal device, to implement downlink data transmission on one hand and control uplink transmission by sending scheduling information on the other hand, and receiving a radio wave sent by the terminal device, to implement uplink data transmission.

The foregoing listed functions and specific implementations of the terminal device, the access network device, and the core network device are merely examples for description, and this application is not limited thereto.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). An operating system may be any one or more computer operating systems, such as a Linux operating system, a Unix operating system, an Android operating system, an iOS operating system, or a Windows operating system, that implement service processing through a process. The application layer includes applications such as a browser, an address book, word processing software, and instant communications software. In addition, a specific structure of an execution body of the method provided in the embodiments of this application is not specifically limited in the embodiments of this application, as long as a program that records code for the method provided in the embodiments of this application can be run to perform communication according to the method provided in the embodiments of this application. For example, the execution body of the method provided in the embodiments of this application may be the terminal device, the network device, or a function module that can invoke and execute the program in the terminal device or the network device.

In addition, aspects or features in the embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel and various other media that can store, contain, and/or carry an instruction and/or data.

It should be noted that in the embodiments of this application, a plurality of applications may be run at the application layer. In this case, an application for performing the communication method in the embodiments of this application and an application configured to control a receive end device to implement an action corresponding to received data may be different applications.

FIG. 1 is a schematic diagram of a system 100 to which a communication method according to an embodiment of this application is applicable. As shown in FIG. 1, the system 100 includes an access network device 102. The access network device 102 may include one or more antennas, for example, antennas 104, 106, 108, 110, 112, and 114. In addition, the access network device 102 may additionally include a transmitter chain and a receiver chain. A person of ordinary skill in the art can understand that the transmitter chain and the receiver chain may include a plurality of components (for example, a processor, a modulator, a multiplexer, a demodulator, a demultiplexer, or an antenna) respectively related to signal sending and receiving.

The access network device 102 may communicate with a plurality of terminal devices (for example, a terminal device 116 and a terminal device 122). However, it may be understood that the access network device 102 may communicate with any quantity of terminal devices that are similar to the terminal device 116 or the terminal device 122. The terminal devices 116 and 122 may each be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 over a forward link (also referred to as a downlink) 118, and receive information from the terminal device 116 over a reverse link (also referred to as an uplink) 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (FDD) system, different frequency bands may be used for the forward link 118 and the reverse link 120, and different frequency bands may be used for the forward link 124 and the reverse link 126.

For another example, in a time division duplex (TDD) system and a full duplex system, a common frequency band may be used for the forward link 118 and the reverse link 120, and a common frequency band may be used for the forward link 124 and the reverse link 126.

Each antenna (or antenna group including a plurality of antennas) and/or area designed for communication are/is referred to as a sector of the access network device 102. For example, an antenna group may be designed to communicate with a terminal device in a sector within coverage of the access network device 102. The access network device may send signals to all terminal devices in the corresponding sector through a single antenna or a multi-antenna transmit diversity. In a process in which the access network device 102 communicates with the terminal devices 116 and 122 respectively over the forward links 118 and 124, a transmit antenna of the access network device 102 may improve signal-to-noise ratios of the forward links 118 and 124 through beamforming. In addition, interference to a mobile device in a neighboring cell when the access network device 102 sends signals through beamforming to the terminal devices 116 and 122 that are randomly scattered in the related coverage is less than that in a manner in which an access network device sends, through a single antenna or a multi-antenna transmit diversity, signals to all terminal devices served by the access network device.

In a given time, the access network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a particular quantity of data bits to be sent on a channel to the wireless communications receiving apparatus. The data bit may be included in a transport block (or a plurality of transport blocks) of the data, and the transport block may be segmented to generate a plurality of code blocks.

In addition, the communications system 100 may be a PLMN, a device-to-device (Device-to-Device, D2D) network, a machine-to-machine (Machine-to-Machine, M2M) network, the IoT, or another network. FIG. 1 is merely a simplified schematic diagram of an example. The network may further include another access network device not shown in FIG. 1.

In the embodiments of this application, data or information may be carried on a time-frequency resource, and the time-frequency resource may include a time domain resource and a frequency domain resource. In time domain, the time-frequency resource may include one or more time domain units. In frequency domain, the time-frequency resource may include one or more frequency domain units.

One time domain unit may be one symbol, one mini-slot, one slot, or one subframe. Duration of one subframe in time domain may be one millisecond (ms). One slot includes seven or 14 symbols. One mini-slot may include at least one symbol (for example, two symbols, seven symbols, 14 symbols, or any quantity of symbols fewer than or equal to 14 symbols).

One frequency domain unit may be one resource block (RB), one resource block group (RBG), or one predefined subband).

In the embodiments of this application, "data" or "information" may be understood as a bit generated after an information block is coded, or may be understood as a modulated symbol generated after coded modulation is performed on an information block.

One information block may include at least one transport block (TB), at least one TB group (including at least one TB), at least one code block (CB), at least one CB group (including at least one CB), or the like.

The communication method in this application may be applied to transmission of a plurality of types of services. The plurality of types of services, for example, may include but are not limited to a. an ultra-reliable low-latency communication (URLLC) service, and b. an enhanced mobile broadband (Enhanced Mobile Broadband, eMBB) service. Specifically, the International Telecommunication Union-Radio communication Sector (ITU-R) has defined application scenarios of future 5G, where the application scenarios may include an eMBB scenario and a URLLC scenario, and also has defined capability requirements on the 5G network from eight dimensions such as throughput, latency, connection density, and spectral efficiency improvement. Main requirements of the eMBB service are a high rate, wide coverage, a transmission latency, and mobility. Main requirements of the URLLC service are extremely high reliability, extremely low mobility, and an extremely low transmission latency. Generally, transmission reliability of a wireless air interface is required to reach 99.999% within 1 millisecond (ms).

In the embodiments of this application, each communications device (for example, the network device or the terminal device) in the communications system 100 may perform communication on a resource (for example, a frequency domain resource) based on a grant-free transmission solution or on a resource (for example, a frequency domain resource) in a scheduling mode. This is not particularly limited in the embodiments of this application. The scheduling mode and a grant-free mode are separately described below.

A. Scheduling Mode

Specifically, in the embodiments of this application, data transmission (for example, uplink transmission or downlink transmission) may be performed based on scheduling by the network device. By way of example rather than limitation, a time domain granularity of the scheduled data transmission may be, for example, a transmission time interval (Transmission Time Interval, TTI), a shortened transmission time interval (shortened Transmission Time Interval, sTTI), a slot, or a mini-slot.

A specific scheduling procedure is A base station sends a control channel, for example, a physical downlink control channel (PDCCH), an enhanced physical downlink control channel (EPDCCH), or a physical downlink control channel used to schedule sTTI transmission (sTTI Physical Downlink Control Channel, sPDCCH). The control channel may carry scheduling information that is in different downlink control information (DCI) formats and that is used to schedule a physical downlink shared channel (PDSCH) or a physical uplink shared channel (PUSCH). The scheduling information includes control information such as resource allocation information and a modulation and coding scheme. The terminal device detects the control channel, and receives a downlink data channel or sends an uplink data channel based on the scheduling information carried on the detected control channel. After an sTTI technology is introduced, the scheduling information carried on the control channel may be used to instruct to receive a downlink data channel whose TTI length is equal to or less than 1 ms or send an uplink data channel whose TTI length is equal to or less than 1 ms. In addition, symbols occupied for transmission of scheduled data may be directly indicated in NR.

B. Grant-Free Mode

Specifically, to implement massive low-latency and high-reliability service transmission in a future network, a grant-free transmission solution may be used. In the embodiments of this application, data transmission may alternatively be grant-free. Grant-free transmission may be denoted as grant free in English. The grant-free transmission herein may be specific to uplink data transmission or downlink data transmission. The grant-free transmission may be understood as any one or more of the following meanings, a combination of some technical features in a plurality of meanings, or another similar meaning.

The grant-free transmission may mean The network device pre-allocates a plurality of transmission resources and notifies the terminal device of the plurality of transmission resources, when the terminal device needs to send uplink data, the terminal device selects at least one of the plurality of transmission resources pre-allocated by the network device, and sends the uplink data on the selected transmission resource, and the network device detects, on one or more of the plurality of pre-allocated transmission resources, the uplink data sent by the terminal device. The detection may be blind detection, or detection performed based on a control field in the uplink data, or detection performed in another manner.

The grant-free transmission may mean The network device pre-allocates a plurality of transmission resources and notifies the terminal device of the plurality of transmission resources, so that when the terminal device needs to send uplink data, the terminal device selects at least one of the plurality of transmission resources pre-allocated by the network device, and sends the uplink data on the selected transmission resource.

The grant-free transmission may mean Information about a plurality of pre-allocated transmission resources is obtained, and when uplink data is intended to be sent, at least one of the plurality of transmission resources is selected, and the uplink data is sent on the selected transmission resource. The information may be obtained from the network device.

The grant-free transmission may refer to a method for implementing uplink data transmission of the terminal device without a dynamic grant of the network device. A dynamic grant-based mode may be a scheduling mode in which the network device indicates a transmission resource for each uplink data transmission of the terminal device by using signaling. Optionally, the implementing uplink data transmission of the terminal device may be understood as allowing uplink data transmission of two or more terminal devices on a same time-frequency resource. Optionally, the transmission resource may be a transmission resource in one or more transmission time units after a moment at which the terminal device receives the signaling. One transmission time unit may be a minimum time unit of one transmission, for example, a TTI or a slot.

The grant-free transmission may be uplink data transmission performed by the terminal device without a grant of the network device. A grant-based mode may be as follows The terminal device sends an uplink scheduling request to the network device. After receiving the scheduling request, the network device sends an uplink grant to the terminal device, where the uplink grant indicates an uplink transmission resource allocated to the terminal device.

The grant-free transmission may be a contention transmission manner, and may specifically mean that a plurality of terminals simultaneously send uplink data on a same pre-allocated time-frequency resource, without scheduling performed by a base station.

The data may include service data or signaling data.

The blind detection may be understood as detection performed, when whether any data arrives is unknown in advance, on data that may arrive. The blind detection may alternatively be understood as detection performed without an indication of explicit signaling.

By way of example rather than limitation, in the embodiments of this application, a basic time unit of the grant-free transmission may be a TTI (for example, the foregoing sTTI). After the sTTI technology is introduced, the grant-free transmission may include receiving a downlink data channel whose TTI length is equal to or less than 1 ms or sending an uplink data channel whose TTI length is equal to or less than 1 ms.

A "grant" may also be referred to as a "grant", and is control information that is sent by the network device (for example, a gNB) or configured at a higher layer and that is used to indicate a PUSCH transmission feature.

Uplink (UL) grants are classified into a dynamic grant and a configured grant in NR.

The dynamic grant transmission refers to normal grant-based (GB) PUSCH transmission. That is, dynamic grant transmission may be transmission based on the foregoing scheduling mode.

The configured grant refers to configuration-based PUSCH transmission. That is, configured grant transmission may be transmission based on the foregoing grant-free mode.

For example, the configured grant may include semi-persistent scheduling (SPS). In addition, the semi-persistent scheduling may also be referred to as a Type 2 configured grant (Type 2 configured grant).

For another example, the configured grant may include grant-free (GF) transmission in NR, and the grant-free transmission is also referred to as a Type 1 configured grant.

For ease of understanding and description, a PUSCH sent in the scheduling mode is referred to as a GB PUSCH below.

A PUSCH sent in the grant-free mode is referred to as a GF PUSCH.

In this application, the terminal device, for example, a media access control (MAC) layer entity of the terminal device, may obtain configuration parameters of logical channels at a MAC layer in a manner such as higher layer configuration.

By way of example rather than limitation, in this application, the logical channels at the MAC layer may be classified into two groups. Each logical channel group may include at least one logical channel.

For one logical channel group (denoted as a logical channel group #1), the GF PUSCH can be used to carry and send data, in other words, data sent on the GF PUSCH can be carried in a logical channel in the logical channel group #1.

In addition, by way of example rather than limitation, a configuration parameter, for example, a parameter for allowing configured Grant Type 1 (configuredGrantType1Allowed), of each logical channel in the logical channel group #1 may be configured as present. Therefore, when determining that a parameter of configuredGrantType1Allowed of a logical channel is present, the terminal device determines that the data sent on the GF PUSCH can be used for the logical channel.

Alternatively, a parameter value of the parameter of configuredGrantType1Allowed may be configured as a preset specified value #a (for example, "1" or "true (True)"). Therefore, when determining that a parameter value of a parameter of configuredGrantType1Allowed of a logical channel is the specified value #a (for example, 1 or true), the terminal device determines that the data sent on the GF PUSCH can be used for the logical channel.

In addition, for another logical channel group (denoted as a logical channel group #2), the GF PUSCH cannot be used to carry and send data, in other words, data sent on the GF PUSCH cannot be carried in a logical channel in the logical channel group #2.

In addition, by way of example rather than limitation, a configuration parameter, for example, a configured Grant Type 1 Allowed parameter, of each logical channel in the logical channel group #2 may be configured as unpresent. Therefore, when determining that a parameter of configuredGrantType1Allowed of a logical channel is unpresent, the terminal device determines that the data sent on the GF PUSCH cannot be used for the logical channel.

Alternatively, a parameter value of the parameter of configuredGrantType1Allowed may be configured as a preset specified value #b (for example, "0" or "false (False)"). Therefore, when determining that a parameter value of a parameter of configuredGrantType1Allowed of a logical channel is the specified value #b (for example, 0 or false), the terminal device determines that the data sent on the GF PUSCH cannot be used for the logical channel.

Therefore, the terminal device can determine whether the data sent on the GF PUSCH can be used for each logical channel, in other words, UE can determine whether each logical channel can correspond to the GF PUSCH.

In addition, in this application, the terminal device may determine the GF PUSCH based on configuration of the network device.

For example, the terminal device, for example, the MAC layer entity of the terminal device, may determine a configuration parameter of the GF PUSCH in a manner such as higher layer configuration.

By way of example rather than limitation, the configuration parameter of the GF PUSCH may include but is not limited to the following parameters: 1. a transmission periodicity of the GF PUSCH, 2. an offset of the GF PUSCH in the transmission periodicity, namely, an offset between a time-domain start position of the GF PUSCH and a start position of the transmission periodicity in which the GF PUSCH is located, 3. a size of a time domain resource occupied by the GF PUSCH, for example, a quantity of time units (for example, symbols) occupied by the GF PUSCH, 4. a frequency domain resource occupied by the GF PUSCH, for example, a size and a frequency domain position of the frequency domain resource occupied by the GF PUSCH, 5. a modulation and coding scheme (MCS) used for the GF PUSCH, for example, an index of the MCS used for the GF PUSCH, or spectral efficiency (SE) corresponding to the MCS used for the GF PUSCH, 6. a repetition number of the GF PUSCH, 7. a redundancy version (RV) pattern of the GF PUSCH, and 8. a transport block (TB) size corresponding to the GF PUSCH, or a size of a basic unit, processed by a physical layer entity, of data exchange between a logical channel and the GF PUSCH.

Therefore, the terminal device (for example, the MAC layer entity of the terminal device) can determine a time domain resource of each GF PUSCH and a configuration parameter of each GF PUSCH.

In addition, in this application, the terminal device may determine the GB PUSCH based on scheduling by the network device, for example, a UL grant sent by the network device.

For example, the terminal device may receive a UL grant in a slot n, and after parsing the UL grant, learn that a GB PUSCH scheduled by using the UL grant is sent in a slot n+2 in a slot-based manner and occupies entire 14 orthogonal frequency division multiplexing (OFDM) symbols.

In addition, the physical layer entity of the terminal device reports the UL grant to the MAC layer entity, so that the MAC layer entity can determine a configuration parameter of the GB PUSCH based on the UL grant.

By way of example rather than limitation, the configuration parameter of the GB PUSCH may include but is not limited to the following parameters: 1. a time domain resource occupied by the GB PUSCH, for example, a size of the time domain resource occupied by the GB PUSCH such as a quantity of time units (for example, symbols) occupied by the GB PUSCH, and a position of the time domain resource occupied by the GB PUSCH such as a start position of the time domain resource occupied by the GB PUSCH, 2. a frequency domain resource occupied by the GB PUSCH, for example, a size and a frequency domain position of the frequency domain resource occupied by the GB PUSCH, 3. an MCS used for the GB PUSCH, for example, an index of the MCS used for the GB PUSCH, or SE corresponding to the MCS used for the GB PUSCH, 4. a repetition number of the GB PUSCH, 5. an RV pattern of the GB PUSCH, and 6. a TB size corresponding to the GB PUSCH, or a size of a basic unit, processed by the physical layer entity, of data exchange between a logical channel and the GB PUSCH.

Therefore, the terminal device (for example, the MAC layer entity of the terminal device) can determine a time domain resource of each GB PUSCH and a configuration parameter of each GB PUSCH.

This application mainly relates to a process of processing a GF PUSCH and a GB PUSCH that overlap in time domain.

To be specific, in this application, a GB PUSCH (denoted as a PUSCH #1) and a GF PUSCH (denoted as a PUSCH #2) may overlap in time domain.

That the PUSCH #1 and the PUSCH #2 overlap in time domain may mean that, for example, the PUSCH #1 and the PUSCH #2 partially overlap in time domain.

Alternatively, that the PUSCH #1 and the PUSCH #2 overlap in time domain may mean that, for example, the PUSCH #1 and the PUSCH #2 completely overlap in time domain.

Alternatively, that the PUSCH #1 and the PUSCH #2 overlap in time domain may mean that, for example, there is at least one same time domain unit between the PUSCH #1 and the PUSCH #2.

For example, there is at least one same subframe between the PUSCH #1 and the PUSCH #2.

Alternatively, there is at least one same slot between the PUSCH #1 and the PUSCH #2.

Alternatively, there is at least one same symbol between the PUSCH #1 and the PUSCH #2.

In addition, the GB PUSCH and the GF PUSCH that overlap in time domain may overlap or may not overlap in frequency domain. This is not particularly limited in this application.

In other words, the PUSCH #1 and the PUSCH #2 may overlap in frequency domain, or the PUSCH #1 and the PUSCH #2 may not overlap in frequency domain.

That the PUSCH #1 and the PUSCH #2 may overlap in frequency domain may mean that t a time-frequency resource #2 occupied by the PUSCH #2 and the time-frequency resource #1 occupied by the PUSCH #1 partially overlap in frequency domain.

Alternatively, that the PUSCH #1 and the PUSCH #2 may overlap in frequency domain may mean that the a time-frequency resource #2 occupied by the PUSCH #2 and the time-frequency resource #1 occupied by the PUSCH #1 completely overlap in frequency domain.

In other words, there is at least one same frequency domain unit between the PUSCH #1 and the PUSCH #2.

For example, there is at least one same subband between the PUSCH #1 and the PUSCH #2.

Alternatively, there is at least one same subcarrier between the PUSCH #1 and the PUSCH #2.

Alternatively, there is at least one same RB between the PUSCH #1 and the PUSCH #2.

Alternatively, there is at least one same RBG between the PUSCH #1 and the PUSCH #2.

With reference to FIG. 2 to FIG. 10, the following describes in detail the communication method in this application by using the PUSCH #1 (the GB PUSCH, namely, an example of a first physical uplink channel) and the PUSCH #2 (the GF PUSCH, namely, an example of a second physical uplink channel) as an example.

Figure 2:
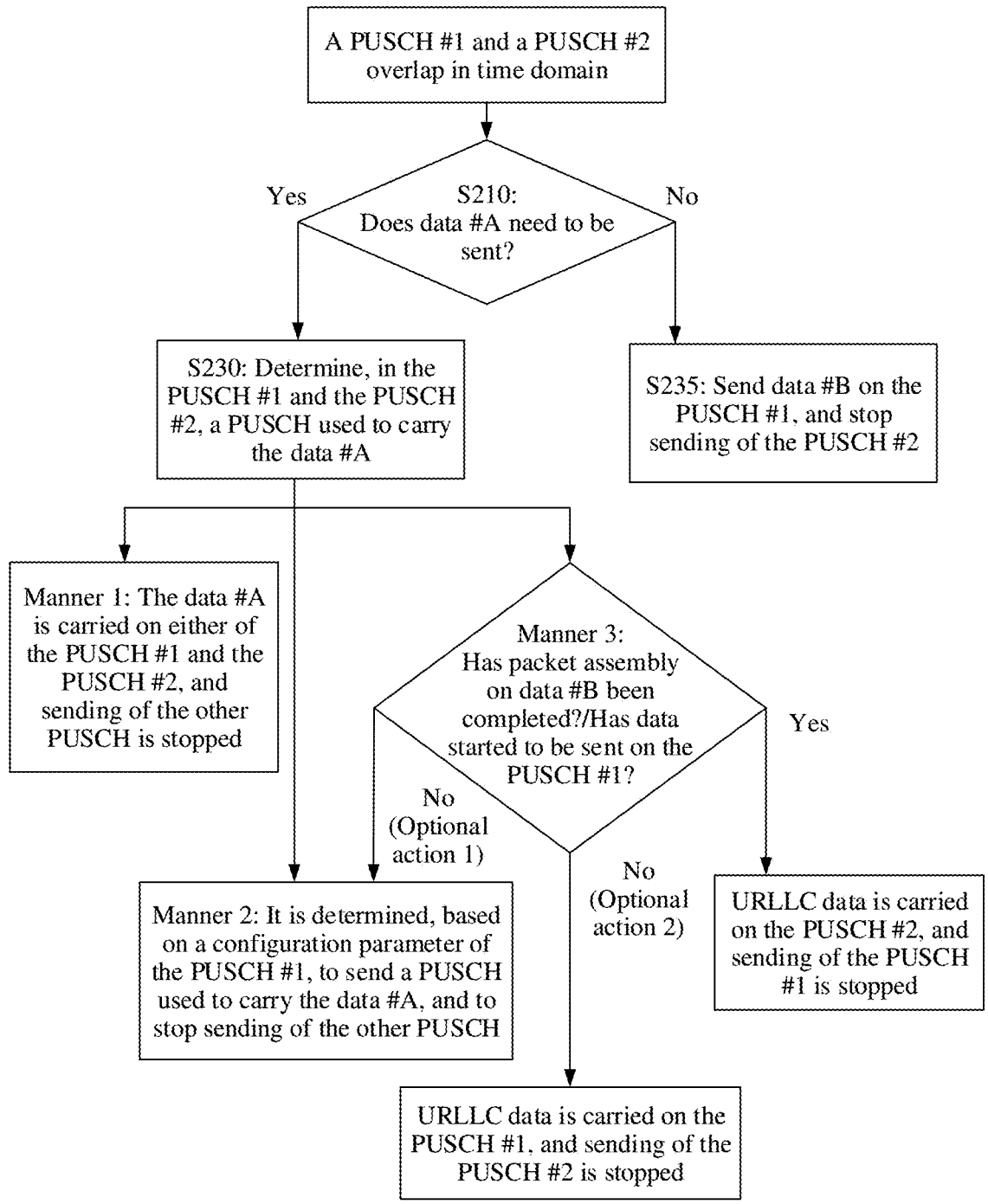
FIG. 2 is a schematic flowchart of an example of a communication method according to this application.

FIG. 2 is a schematic flowchart of an example of a process of processing the PUSCH #1 and the PUSCH #2.

As shown in FIG. 2, in S210, UE (for example, a MAC layer entity of the UE) may perform determining #A, determine a result (namely, a first determining result) of the determining #A, and further determine, in the PUSCH #1 and the PUSCH #2 based on the result of the determining #A, a PUSCH that is intended to be sent or sending of a PUSCH that needs to be stopped.

In this application, the determining #A may include any one of the following determining.

1. Determining about whether data #A (namely, an example of first data) needs to be sent.

It should be noted that in this application, "whether data #A needs to be sent" may be understood as whether the data #A arrives on a logical channel.

Alternatively, "whether data #A needs to be sent" may be understood as whether the to-be-sent data #A exists on a logical channel.

Alternatively, "whether data #A needs to be sent" may be understood as whether the data #A on a logical channel has started to be sent but has not been completely sent.

In this application, the data #A (specifically, a type of the data #A) may be predefined in a communications system or a communications protocol, or may be determined by a network device and notified to a terminal device.

For example, the data #A may be URLLC data.

For another example, the data #A may be data on a logical channel #A (namely, an example of a first logical channel).

In this application, the logical channel #A may be predefined in the communications system or a communications protocol, or may be determined by the network device and notified to the terminal device.

For example, the logical channel #A may be a logical channel used to carry the URLLC data.

For another example, the logical channel #A may be a logical channel corresponding to the GF PUSCH, in other words, the logical channel #A is a logical channel that may carry and send data on the GF PUSCH.

For another example, the logical channel #A may be a logical channel belonging to the foregoing logical channel group #1.

For another example, the logical channel #A may be a logical channel whose parameter of configuredGrantType1Allowed is present.

For another example, the logical channel #A may be a logical channel whose parameter of configuredGrantType1Allowed is set to 1.

For another example, the data #A may be data in a higher layer data flow that arrives at a MAC layer and that has a preset QoS requirement.

It should be understood that the foregoing listed specific examples of the data #A are merely for description, and this application is not limited thereto. The data #A may alternatively be other data that has a relatively high transmission latency requirement in addition to the URLLC data, or may be other data that has a relatively high reliability requirement in addition to the URLLC data.

For example, in this embodiment of the present invention, a type of a service to which the data #A belongs may be a specified service type, for example, a real-time communication service, a warning (for example, for a disaster such as an earthquake or a tsunami) service, or an internet of vehicles service.

2. Determining about whether data that is intended to be sent (specifically, to a physical layer) exists on the logical channel #A.

It should be noted that in this application, "whether data exists on the logical channel #A" may be understood as whether data arrives on the logical channel #A.

Alternatively, "whether data exists on the logical channel #A" may be understood as whether to-be-sent data exists on the logical channel #A.

Alternatively, "whether data exists on the logical channel #A" may be understood as that when data exists on the logical channel #A, whether the data has started to be sent but has not been completely sent.

Then, the UE (for example, the MAC layer entity of the UE) may determine, in the PUSCH #1 and the PUSCH #2 based on the result of the determining #A, the PUSCH that is intended to be sent or sending of a PUSCH that needs to be stopped.

In this application, the result of the determining #A includes two cases: The data #A needs to be sent, or data exists on the logical channel #A (namely, Case 1). The data #A does not need to be sent, or no data exists on the logical channel #A (namely, Case 2). The following separately describes in detail processing in the two cases.

Case 2

That is, if the result of the determining #A is no, perform S235.

In S235, the UE (for example, the MAC layer entity of the UE) may determine the PUSCH #1 as the PUSCH that is intended to be sent, and determine the PUSCH #2 as the PUSCH whose sending needs to be stopped.

It should be noted that in this application, "stopping sending of a PUSCH" may be understood as If the PUSCH has not started to be sent, sending of the PUSCH is cancelled.

Alternatively, "stopping sending of a PUSCH" may be understood as If the PUSCH has started to be sent, sending of the PUSCH is suspended or stopped.

Optionally, "stopping sending of a PUSCH" may be understood as If logical channel prioritization LCP processing has not been started for the PUSCH at the media access control (MAC) layer, or packet assembly into a MAC layer packet data unit PDU has not been started for the PUSCH, or packet assembly into a MAC PDU corresponding to the PUSCH has not been completed, the MAC layer entity stops or interrupts the LCP processing or the MAC PDU packet assembly for the PUSCH, to be specific, the MAC layer entity neither completes the packet assembly performed for the PUSCH, nor instructs a physical PHY layer entity to send the PUSCH.

Optionally, "stopping sending of a PUSCH" may be understood as If a PHY layer entity has received the MAC PDU for the PUSCH from the MAC layer, but has not sent the PUSCH, the PHY layer entity stops or cancels sending of the PUSCH at the physical layer.

Optionally, "stopping sending of a PUSCH" may be understood as If a PHY layer entity has received the MAC PDU for the PUSCH from the MAC layer, and has started to send the PUSCH, sending of the PUSCH is stopped or interrupted at the PHY layer.

In addition, in Case 2, namely, in S235, data carried on the PUSCH #1 may be data (for example, eMBB data) that is originally to be sent. In other words, in Case 2, data carried on the PUSCH #1 may be data scheduled by using a UL grant.

Optionally, if the result of the determining #A is no, for example, URLLC data does not need to be sent currently, and the to-be-sent data is eMBB data, even if the PUSCH #1 cannot meet a transmission resource requirement of the eMBB data, in other words, a maximum amount of data that can be carried on the PUSCH #1 is less than an amount of the eMBB data, the terminal device may still determine the PUSCH #1 as the PUSCH that is intended to be sent, and stop sending of the PUSCH #2.

A reason is as follows. Transmission efficiency of the eMBB data on the GF PUSCH is relatively low. Therefore, even if the PUSCH #1 cannot meet the resource requirement of the eMBB data, the eMBB data can still be sent on the PUSCH #1, so that the transmission efficiency of the eMBB data can be improved.

Case 1

That is, if the result of the determining #A is yes, perform S230.

In this embodiment of this application, S230 may be performed in any one of the following manners.

Manner 1

Optionally, the UE (for example, the MAC layer entity of the UE) may determine either of the PUSCH #1 and the PUSCH #2 as the PUSCH that is intended to be sent, and determine the other one as the PUSCH whose sending needs to be stopped.

For example, the UE (for example, the MAC layer entity of the UE) may determine the PUSCH #2 as the PUSCH that is intended to be sent, and determine the PUSCH #1 as the PUSCH whose sending needs to be stopped.

Manner 2

Optionally, the UE (for example, the MAC layer entity of the UE) may determine, in the PUSCH #1 and the PUSCH #2 based on a configuration parameter #A of the PUSCH #1, the PUSCH that is intended to be sent or sending of a PUSCH that needs to be stopped.

By way of example rather than limitation, in this application, the configuration parameter #A may be at least one of the following parameters.

Parameter #1: a time length of the PUSCH #1, for example, a quantity of symbols occupied by the PUSCH #1.

For example, if the UE (for example, the MAC layer entity of the UE) determines that the quantity of symbols occupied by the PUSCH #1 is less than or equal to a threshold #1 (namely, an example of a first threshold), the UE may determine to send the PUSCH #1, and stop sending of the PUSCH #2.

Alternatively, if the UE (for example, the MAC layer entity of the UE) determines that the quantity of symbols occupied by the PUSCH #1 is greater than the threshold #1, the UE may determine to send the PUSCH #2, and stop sending of the PUSCH #1.

It should be noted that in this application, the threshold #1 may be preconfigured in the communications system or a communications protocol, or may be determined by the network device and notified to the terminal device.

In addition, by way of example rather than limitation, the threshold #1 may be determined based on a time length of the PUSCH #2, for example, a quantity of symbols occupied by the PUSCH #2. For example, a value of the threshold #1 may be a value of the quantity of symbols occupied by the PUSCH #2.

Alternatively, Manner 2 may be implemented by comparing a value of the quantity of symbols occupied by the PUSCH #1 with the value of the quantity of symbols occupied by the PUSCH #2.

For example, if the UE (for example, the MAC layer entity of the UE) determines that the quantity of symbols occupied by the PUSCH #1 is less than or equal to the quantity of symbols occupied by the PUSCH #2, the UE may determine to send the PUSCH #1, and stop sending of the PUSCH #2.

For another example, if the UE (for example, the MAC layer entity of the UE) determines that the quantity of symbols occupied by the PUSCH #1 is greater than the quantity of symbols occupied by the PUSCH #2, the UE may determine to send the PUSCH #2, and stop sending of the PUSCH #1.

Parameter #2: an MCS of the PUSCH #1, for example, SE corresponding to the MCS of the PUSCH #1.

For example, if the UE (for example, the MAC layer entity of the UE) determines that the SE corresponding to the MCS of the PUSCH #1 is less than or equal to a threshold #2 (namely, an example of a second threshold), the UE may determine to send the PUSCH #1, and stop sending of the PUSCH #2.

Alternatively, if the UE (for example, the MAC layer entity of the UE) determines that the SE corresponding to the MCS of the PUSCH #1 is greater than the threshold #2, the UE may determine to send the PUSCH #2, and stop sending of the PUSCH #1.

It should be noted that in this application, the threshold #2 may be preconfigured in the communications system or a communications protocol, or may be determined by the network device and notified to the terminal device.

In addition, by way of example rather than limitation, the threshold #2 may be determined based on an MCS of the PUSCH #2, for example, SE corresponding to the MCS of the PUSCH #2. For example, a value of the threshold #2 may be a value of the SE corresponding to the MCS of the PUSCH #2.

Alternatively, Manner 2 may be implemented by comparing a value of the SE corresponding to the MCS of the PUSCH #1 with the value of the SE corresponding to the MCS of the PUSCH #2.

For example, if the UE (for example, the MAC layer entity of the UE) determines that the SE corresponding to the MCS of the PUSCH #1 is less than or equal to the SE corresponding to the MCS of the PUSCH #2, the UE may determine to send the PUSCH #1, and stop sending of the PUSCH #2.

For another example, if the UE (for example, the MAC layer entity of the UE) determines that the SE corresponding to the MCS of the PUSCH #1 is greater than the SE corresponding to the MCS of the PUSCH #2, the UE may determine to send the PUSCH #2, and stop sending of the PUSCH #1.

It should be understood that the foregoing listed use manners of the MCS are merely examples for description, and this application is not limited thereto. For example, the determining may alternatively be performed based on an index of the MCS of the PUSCH #1.

For example, if the UE (for example, the MAC layer entity of the UE) determines that the index of the MCS of the PUSCH #1 is less than or equal to a threshold #3 (namely, an example of a third threshold), the UE may determine to send the PUSCH #1, and stop sending of the PUSCH #2.

Alternatively, if the UE (for example, the MAC layer entity of the UE) determines that the index of the MCS of the PUSCH #1 is greater than the threshold #3, the UE may determine to send the PUSCH #2, and stop sending of the PUSCH #1.

In addition, similar to the threshold #2, the threshold #3 may be determined based on an index of the MCS of the PUSCH #2. For example, a value of the threshold #3 may be a value of the index (index) of the MCS of the PUSCH #2.

It should be noted that the parameter #1 and the parameter #2 may be separately used or may be used in combination. This is not determined in this application.

For example, if the UE (for example, the MAC layer entity of the UE) determines that the quantity of symbols occupied by the PUSCH #1 is less than or equal to the threshold #1, and the SE corresponding to the MCS of the PUSCH #1 is less than or equal to the threshold #2, the UE may determine to send the PUSCH #1, and stop sending of the PUSCH #2.

For another example, if the UE (for example, the MAC layer entity of the UE) determines that the quantity of symbols occupied by the PUSCH #1 is less than or equal to the threshold #1, and the SE corresponding to the MCS of the PUSCH #1 is greater than the threshold #2, the UE may determine to send the PUSCH #2, and stop sending of the PUSCH #1.

For another example, if the UE (for example, the MAC layer entity of the UE) determines that the quantity of symbols occupied by the PUSCH #1 is greater than the threshold #1, and the SE corresponding to the MCS of the PUSCH #1 is greater than the threshold #2, the UE may determine to send the PUSCH #2, and stop sending of the PUSCH #1.

For another example, if the UE (for example, the MAC layer entity of the UE) determines that the quantity of symbols occupied by the PUSCH #1 is greater than the threshold #1, and the SE corresponding to the MCS of the PUSCH #1 is less than or equal to the threshold #2, the UE may determine to send the PUSCH #2, and stop sending of the PUSCH #1.

Parameter #3: a TBS of the PUSCH #1.

For example, if the UE (for example, the MAC layer entity of the UE) determines that the TBS of the PUSCH #1 is greater than or equal to a threshold #4 (namely, an example of a fourth threshold), the UE may determine to send the PUSCH #1, and stop sending of the PUSCH #2.

Alternatively, if the UE (for example, the MAC layer entity of the UE) determines that the TBS of the PUSCH #1 is less than the threshold #4, the UE may determine to send the PUSCH #2, and stop sending of the PUSCH #1.

It should be noted that in this application, the threshold #4 may be preconfigured in the communications system or a communications protocol, or may be determined by the network device and notified to the terminal device.

In addition, by way of example rather than limitation, the threshold #4 may be determined based on a TBS of the PUSCH #2. For example, a value of the threshold #4 may be a value of the TBS of the PUSCH #2.

Alternatively, Manner 2 may be implemented by comparing a value of the TBS of the PUSCH #1 with the value of the TBS of the PUSCH #2.

For example, if the UE (for example, the MAC layer entity of the UE) determines that the TBS of the PUSCH #1 is greater than or equal to the TBS of the PUSCH #2, the UE may determine to send the PUSCH #1, and stop sending of the PUSCH #2.

For another example, if the UE (for example, the MAC layer entity of the UE) determines that the TBS of the PUSCH #1 is less than the TBS of the PUSCH #2, the UE may determine to send the PUSCH #2, and stop sending of the PUSCH #1.

It should be noted that the parameter #1, the parameter #2, and the parameter #3 may be separately used or may be used in combination. This is not determined in this application.

For example, if the UE (for example, the MAC layer entity of the UE) determines that the quantity of symbols occupied by the PUSCH #1 is less than or equal to the threshold #1 (namely, an example of the first threshold), the SE corresponding to the MCS of the PUSCH #1 is less than or equal to the threshold #2, and the TBS of the PUSCH #1 is greater than or equal to the threshold #4, the UE may determine to send the PUSCH #1, and stop sending of the PUSCH #2.

For another example, if the UE (for example, the MAC layer entity of the UE) determines that the quantity of symbols occupied by the PUSCH #1 is less than or equal to the threshold #1 (namely, an example of the first threshold), the SE corresponding to the MCS of the PUSCH #1 is greater than the threshold #2, and the TBS of the PUSCH #1 is less than the threshold #4, the UE may determine to send the PUSCH #2, and stop sending of the PUSCH #1.

For another example, if the UE (for example, the MAC layer entity of the UE) determines that the quantity of symbols occupied by the PUSCH #1 is greater than the threshold #1 (namely, an example of the first threshold), the SE corresponding to the MCS of the PUSCH #1 is greater than the threshold #2, and the TBS of the PUSCH #1 is less than the threshold #4, the UE may determine to send the PUSCH #2, and stop sending of the PUSCH #1.

For another example, if the UE (for example, the MAC layer entity of the UE) determines that the quantity of symbols occupied by the PUSCH #1 is greater than the threshold #1 (namely, an example of the first threshold), the SE corresponding to the MCS of the PUSCH #1 is greater than the threshold #2, and the TBS of the PUSCH #1 is greater than or equal to the threshold #4, the UE may determine to send the PUSCH #2, and stop sending of the PUSCH #1.

For another example, if the UE (for example, the MAC layer entity of the UE) determines that the quantity of symbols occupied by the PUSCH #1 is greater than the threshold #1 (namely, an example of the first threshold), the SE corresponding to the MCS of the PUSCH #1 is less than or equal to the threshold #2, and the TBS of the PUSCH #1 is less than the threshold #4, the UE may determine to send the PUSCH #2, and stop sending of the PUSCH #1.

For another example, if the UE (for example, the MAC layer entity of the UE) determines that the quantity of symbols occupied by the PUSCH #1 is greater than the threshold #1 (namely, an example of the first threshold), the SE corresponding to the MCS of the PUSCH #1 is less than or equal to the threshold #2, and the TBS of the PUSCH #1 is greater than or equal to the threshold #4, the UE may determine to send the PUSCH #2, and stop sending of the PUSCH #1.

Parameter #4: a repetition number (repetition number) of the PUSCH #1.

For example, if the UE (for example, the MAC layer entity of the UE) determines that the repetition number of the PUSCH #1 is greater than or equal to a threshold #5 (namely, an example of a fifth threshold), the UE may determine to send the PUSCH #1, and stop sending of the PUSCH #2.

Alternatively, if the UE (for example, the MAC layer entity of the UE) determines that the repetition number of the PUSCH #1 is less than the threshold #5, the UE may determine to send the PUSCH #2, and stop sending of the PUSCH #1.

It should be noted that in this application, the threshold #5 may be preconfigured in the communications system or a communications protocol, or may be determined by the network device and notified to the terminal device.

[moo] In addition, by way of example rather than limitation, the threshold #5 may be determined based on a repetition number of the PUSCH #2. For example, a value of the threshold #5 may be a value of the repetition number of the PUSCH #2.

Alternatively, Manner 2 may be implemented by comparing a value of the repetition number of the PUSCH #1 with the value of the repetition number of the PUSCH #2.

For example, if the UE (for example, the MAC layer entity of the UE) determines that the repetition number of the PUSCH #1 is greater than or equal to the repetition number of the PUSCH #2, the UE may determine to send the PUSCH #1, and stop sending of the PUSCH #2.

For another example, if the UE (for example, the MAC layer entity of the UE) determines that the repetition number of the PUSCH #1 is less than the repetition number of the PUSCH #2, the UE may determine to send the PUSCH #2, and stop sending of the PUSCH #1.

It should be noted that the parameter #1, the parameter #2, the parameter #3, and the parameter #4 may be separately used or may be used in combination. This is not determined in this application.

For example, if the UE (for example, the MAC layer entity of the UE) determines that the quantity of symbols occupied by the PUSCH #1 is less than or equal to the threshold #1 (namely, an example of the first threshold), the SE corresponding to the MCS of the PUSCH #1 is less than or equal to the threshold #2, the TBS of the PUSCH #1 is greater than or equal to the threshold #4, and the repetition number of the PUSCH #1 is greater than or equal to the threshold #5, the UE may determine to send the PUSCH #1, and stop sending of the PUSCH #2.

For another example, if the UE (for example, the MAC layer entity of the UE) determines that the quantity of symbols occupied by the PUSCH #1 is less than or equal to the threshold #1 (namely, an example of the first threshold), the SE corresponding to the MCS of the PUSCH #1 is less than or equal to the threshold #2, the TBS of the PUSCH #1 is greater than or equal to the threshold #4, and the repetition number of the PUSCH #1 is less than the threshold #5, the UE may determine to send the PUSCH #2, and stop sending of the PUSCH #1.

For another example, if the UE (for example, the MAC layer entity of the UE) determines that the quantity of symbols occupied by the PUSCH #1 is less than or equal to the threshold #1 (namely, an example of the first threshold), the SE corresponding to the MCS of the PUSCH #1 is greater than the threshold #2, the TBS of the PUSCH #1 is less than the threshold #4, and the repetition number of the PUSCH #1 is greater than or equal to the threshold #5, the UE may determine to send the PUSCH #2, and stop sending of the PUSCH #1.

For another example, if the UE (for example, the MAC layer entity of the UE) determines that the quantity of symbols occupied by the PUSCH #1 is less than or equal to the threshold #1 (namely, an example of the first threshold), the SE corresponding to the MCS of the PUSCH #1 is greater than the threshold #2, the TBS of the PUSCH #1 is less than the threshold #4, and the repetition number of the PUSCH #1 is less than the threshold #5, the UE may determine to send the PUSCH #2, and stop sending of the PUSCH #1.

For another example, if the UE (for example, the MAC layer entity of the UE) determines that the quantity of symbols occupied by the PUSCH #1 is greater than the threshold #1 (namely, an example of the first threshold), the SE corresponding to the MCS of the PUSCH #1 is greater than the threshold #2, the TBS of the PUSCH #1 is less than the threshold #4, and the repetition number of the PUSCH #1 is greater than or equal to the threshold #5, the UE may determine to send the PUSCH #2, and stop sending of the PUSCH #1.

For another example, if the UE (for example, the MAC layer entity of the UE) determines that the quantity of symbols occupied by the PUSCH #1 is greater than the threshold #1 (namely, an example of the first threshold), the SE corresponding to the MCS of the PUSCH #1 is greater than the threshold #2, the TBS of the PUSCH #1 is less than the threshold #4, and the repetition number of the PUSCH #1 is less than the threshold #5, the UE may determine to send the PUSCH #2, and stop sending of the PUSCH #1.

For another example, if the UE (for example, the MAC layer entity of the UE) determines that the quantity of symbols occupied by the PUSCH #1 is greater than the threshold #1 (namely, an example of the first threshold), the SE corresponding to the MCS of the PUSCH #1 is greater than the threshold #2, the TBS of the PUSCH #1 is greater than or equal to the threshold #4, and the repetition number of the PUSCH #1 is less than the threshold #5, the UE may determine to send the PUSCH #2, and stop sending of the PUSCH #1.

For another example, if the UE (for example, the MAC layer entity of the UE) determines that the quantity of symbols occupied by the PUSCH #1 is greater than the threshold #1 (namely, an example of the first threshold), the SE corresponding to the MCS of the PUSCH #1 is greater than the threshold #2, the TBS of the PUSCH #1 is greater than or equal to the threshold #4, and the repetition number of the PUSCH #1 is greater than or equal to the threshold #5, the UE may determine to send the PUSCH #2, and stop sending of the PUSCH #1.

For another example, if the UE (for example, the MAC layer entity of the UE) determines that the quantity of symbols occupied by the PUSCH #1 is greater than the threshold #1 (namely, an example of the first threshold), the SE corresponding to the MCS of the PUSCH #1 is less than or equal to the threshold #2, the TBS of the PUSCH #1 is less than the threshold #4, and the repetition number of the PUSCH #1 is greater than or equal to the threshold #5, the UE may determine to send the PUSCH #2, and stop sending of the PUSCH #1.

For another example, if the UE (for example, the MAC layer entity of the UE) determines that the quantity of symbols occupied by the PUSCH #1 is greater than the threshold #1 (namely, an example of the first threshold), the SE corresponding to the MCS of the PUSCH #1 is less than or equal to the threshold #2, the TBS of the PUSCH #1 is less than the threshold #4, and the repetition number of the PUSCH #1 is less than the threshold #5, the UE may determine to send the PUSCH #2, and stop sending of the PUSCH #1.

For another example, if the UE (for example, the MAC layer entity of the UE) determines that the quantity of symbols occupied by the PUSCH #1 is greater than the threshold #1 (namely, an example of the first threshold), the SE corresponding to the MCS of the PUSCH #1 is less than or equal to the threshold #2, the TBS of the PUSCH #1 is greater than or equal to the threshold #4, and the repetition number of the PUSCH #1 is less than the threshold #5, the UE may determine to send the PUSCH #2, and stop sending of the PUSCH #1.

For another example, if the UE (for example, the MAC layer entity of the UE) determines that the quantity of symbols occupied by the PUSCH #1 is greater than the threshold #1 (namely, an example of the first threshold), the SE corresponding to the MCS of the PUSCH #1 is less than or equal to the threshold #2, the TBS of the PUSCH #1 is greater than or equal to the threshold #4, and the repetition number of the PUSCH #1 is greater than or equal to the threshold #5, the UE may determine to send the PUSCH #2, and stop sending of the PUSCH #1.

Parameter #5: a time interval between a moment (denoted as a moment #A) of obtaining the result of the determining #A and a start moment (denoted as a moment #B) of the PUSCH #1.

For example, if the interval between the moment #A and the moment #B is less than or equal to a threshold #6 (namely, an example of a time threshold), the UE may determine to send the PUSCH #1, and stop sending of the PUSCH #2.

Alternatively, if the interval between the moment #A and the moment #B is greater than the threshold #6, the UE may determine to send the PUSCH #2, and stop sending of the PUSCH #1.

It should be noted that in this application, the threshold #6 may be preconfigured in the communications system or a communications protocol, or may be determined by the network device and notified to the terminal device.

Manner 3

The UE (for example, the MAC layer entity of the UE) may perform determining #B, determine a result (namely, a second determining result) of the determining #B, and further determine, in the PUSCH #1 and the PUSCH #2 based on the result of the determining #B, the PUSCH that is intended to be sent or sending of a PUSCH that needs to be stopped.

In this application, the determining #B may include any one of the following determining.

1. Determining about whether logical channel prioritization (Logical channel prioritization, LCP) processing has been started for the PUSCH #1 at the MAC layer.

2. Determining about whether packet assembly has been started at the MAC layer on data (denoted as data #B) corresponding to the PUSCH #1.

For example, the data #B may be eMBB data, or may be data or information used for channel detection.

It should be understood that the foregoing listed specific examples of the data #B are merely for description, and this application is not limited thereto. The data #B may alternatively be data in addition to the URLLC data.

For example, in this embodiment of the present invention, a type of a service to which the data #B belongs may be a specified service type, for example, a data download service.

3. Determining about whether packet assembly on the data (namely, the data #B) corresponding to the PUSCH #1 has been completed at the MAC layer, in other words, determining about whether packet assembly into a MAC layer packet data unit (Packet Data Unit, PDU) corresponding to the data #B has been completed at the MAC layer.

4. Determining about whether the PUSCH #1 has started to be sent at the PHY layer.

It should be noted that in this application, "whether the PUSCH #1 has started to be sent" may be understood as whether resource mapping for the PUSCH #1 has been completed and the PUSCH #1 is in a sendable state.

Alternatively, "whether the PUSCH #1 has started to be sent" may be understood as whether the PUSCH #1 is being sent but has not been completely sent.

5. Determining about whether a time interval between a moment (denoted as a moment #A) of obtaining the result of the determining #A and a start moment (denoted as a moment #B) of the PUSCH #1 is less than or equal to a preset time threshold.

For example, if the interval between the moment #A and the moment #B is less than or equal to a threshold #6 (namely, an example of the time threshold), the UE may determine to send the PUSCH #1, and stop sending of the PUSCH #2.

Alternatively, if the interval between the moment #A and the moment #B is greater than the threshold #6, the UE may determine to send the PUSCH #2, and stop sending of the PUSCH #1.

It should be noted that in this application, the threshold #6 may be preconfigured in the communications system or a communications protocol, or may be determined by the network device and notified to the terminal device.

Then, the UE (for example, the MAC layer entity of the UE) may determine, in the PUSCH #1 and the PUSCH #2 based on the result of the determining #B, the PUSCH that is intended to be sent or sending of a PUSCH that needs to be stopped.

For example, if the UE (for example, the MAC layer entity of the UE) determines that the result of the determining #B is yes, the UE may determine to send the PUSCH #2, and stop sending of the PUSCH #1.

For another example, if the UE (for example, the MAC layer entity of the UE) determines that the result of the determining #B is no, the UE may determine to send the PUSCH #1, and stop sending of the PUSCH #2.

It should be understood that Manner 2 and Manner 3 listed above may be separately used, or may be used in combination. For example, the UE may preliminarily determine, in Manner 3, a PUSCH that is intended to be sent, and finally determine, in Manner 2, the PUSCH that is intended to be sent.

For example, as shown by an optional action 2 in FIG. 2, if the result of the determining #B is yes, processing in Manner 3 may be performed, and a preliminarily determined result is used as a final result.

For another example, as shown by an optional action 3 in FIG. 2, if the result of the determining #B is no, processing in Manner 2 may further be performed, and the PUSCH that is intended to be sent is finally determined based on a processing result in Manner 2.

It should be noted that, in Case 2, namely, in S230, if it is determined that the PUSCH #1 needs to be sent, the data carried on the PUSCH #1 is not only the data (for example, the eMBB data) originally to be sent. In other words, in Case 2, the data carried on the PUSCH #1 is not only the data scheduled by using the UL grant.

In other words, in Case 2, namely, in S230, if it is determined that the PUSCH #1 needs to be sent, the data carried on the PUSCH #1 is the foregoing data #A (namely, the data on the logical channel #A).

Figure 3:
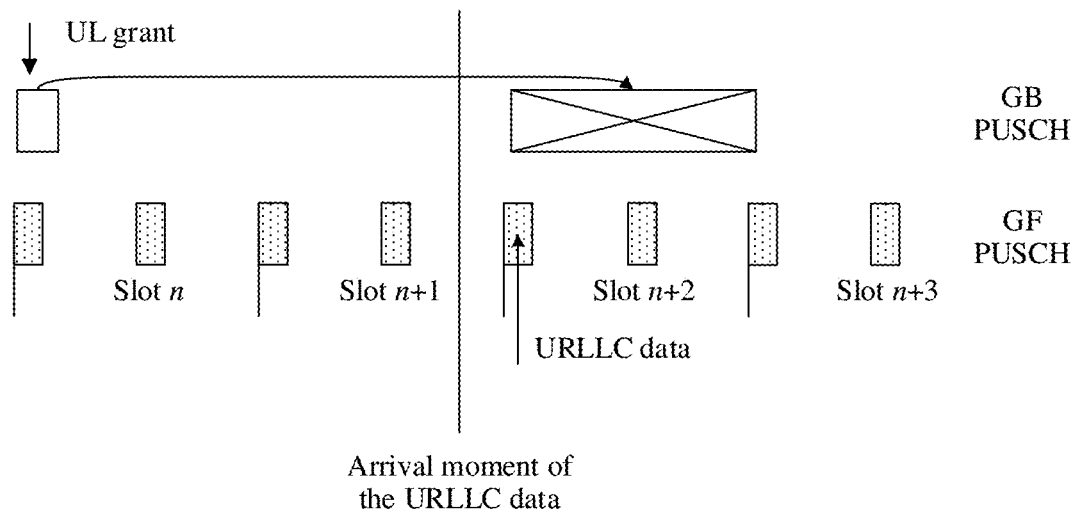
FIG. 3 is a schematic diagram of an example of a pattern of a physical uplink channel according to this application.

FIG. 3 is a schematic diagram of an example of a pattern of a physical uplink channel according to this application. As shown in FIG. 3, it is assumed that transmission of a GF PUSCH occupies two symbols, a transmission periodicity of the GF PUSCH is seven OFDM symbols, and spectral efficiency corresponding to an MCS of the GF PUSCH is SE #1. In this case, the threshold #1 may be 2.

In addition, it is assumed that the UE receives a UL grant in a slot n, and after parsing the UL grant, learns that a GB PUSCH scheduled by using the UL grant is sent in a slot n+2 and occupies symbols 0 to 13. The PHY layer entity on the UE side reports the UL grant to the MAC layer entity and notifies the MAC layer entity of transmission features of the GB PUSCH, where the transmission features include a time domain position, a time length, an MCS, a TBS, and the like.

As shown in FIG. 3, in a slot n+1, the UE needs to send URLLC data.

For example, after the URLLC data arrives, the URLLC data cannot be sent on a GF PUSCH before the GB PUSCH in time, and needs to be sent on GF PUSCH resources overlapping the GB PUSCH, or there is a GF PUSCH before the GB PUSCH but the URLLC data is not completely sent, and a remaining part of the URLLC data is intended to be sent on GF PUSCH resources overlapping the GB PUSCH.

If the UE finds, at the MAC layer, that the GB PUSCH and the GF PUSCH resources overlap in time domain, more precisely, the GB PUSCH and two GF PUSCHs overlap, the MAC layer entity performs PUSCH deletion.

As shown in FIG. 3, because the time length of the GB PUSCH is 14 symbols, and is greater than the threshold #1, the MAC layer entity selects the GF PUSCH to carry the URLLC data, more precisely, selects the first GF PUSCH resource to carry the data and cancels transmission of the GB PUSCH.

Alternatively, because the MAC layer entity has not completed packet assembly for the GB PUSCH at an arrival moment of the URLLC data, the MAC layer entity performs determining. Because the time length of the GB PUSCH is 14 symbols, and is greater than the threshold #1, the MAC layer entity selects the GF PUSCH to carry the URLLC data. In this way, the MAC layer entity interrupts the packet assembly for the GB PUSCH and starts packet assembly for the GF PUSCH.

The UE performs, at the MAC layer, logical channel deletion and LCP processing based on a feature of the selected PUSCH, and after completing MAC PDU packet assembly, delivers an assembled packet to the PHY layer entity, and notifies the PHY layer entity that the selected PUSCH is the GF PUSCH. The PHY layer entity performs transmission of the GF PUSCH according to an instruction of the MAC layer, where the transmission includes performing scrambling, modulation and coding, layer mapping, resource mapping, and transform precoding (if the TP is required for higher-layer configuration) on the data packet delivered by the MAC layer entity, to complete uplink information transmission.

Correspondingly, because a gNB side does not learn whether the URLLC data arrives on the UE side, the gNB end needs to perform signal receiving on both the GB PUSCH and the GF PUSCH resource.

Figure 4:
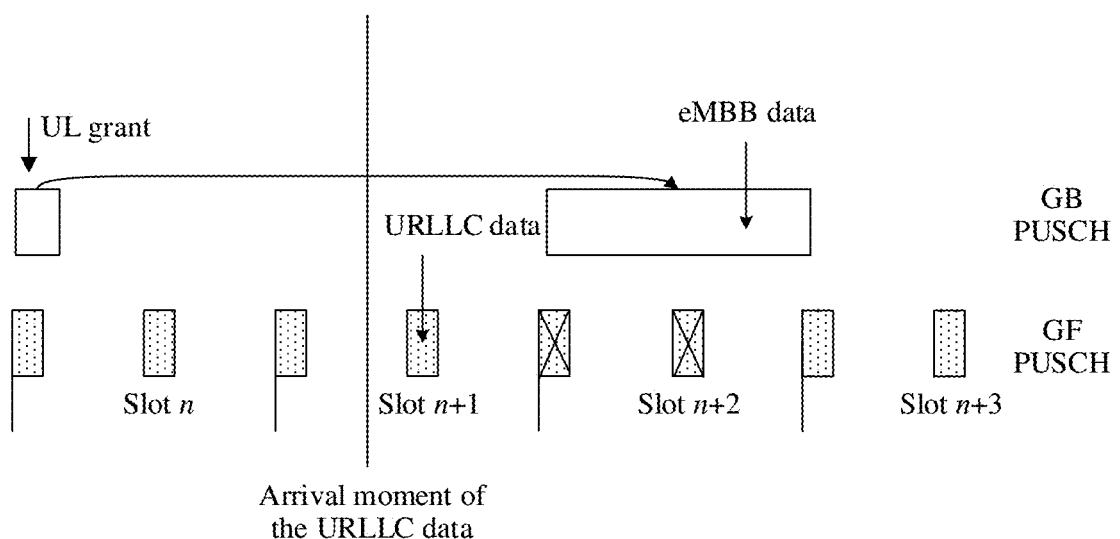
FIG. 4 is a schematic diagram of another example of a pattern of a physical uplink channel according to this application.

FIG. 4 is a schematic diagram of another example of a pattern of a physical uplink channel according to this application. As shown in FIG. 4, it is assumed that transmission of a GF PUSCH occupies two symbols, a transmission periodicity of the GF PUSCH is seven OFDM symbols, and spectral efficiency corresponding to an MCS of the GF PUSCH is SE #1. In this case, the threshold #1 may be 2.

In addition, it is assumed that the UE receives a UL grant in a slot n, and after parsing the UL grant, learns that a GB PUSCH scheduled by using the UL grant is sent in a slot n+2 and occupies symbols 0 to 13. The PHY layer entity on the UE side reports the UL grant to the MAC layer entity and notifies the MAC layer entity of transmission features of the GB PUSCH, where the transmission features include a time domain position, a time length, an MCS, a TBS, and the like.

A difference from the example shown in FIG. 3 is that, as shown in FIG. 4, after URLLC data arrives, the URLLC data can be sent on a GF PUSCH before the GB PUSCH, and all the URLLC data is sent. In this case, the UE selects the GB PUSCH to carry the data, and cancels transmission of two GF PUSCHs.

Figure 5:
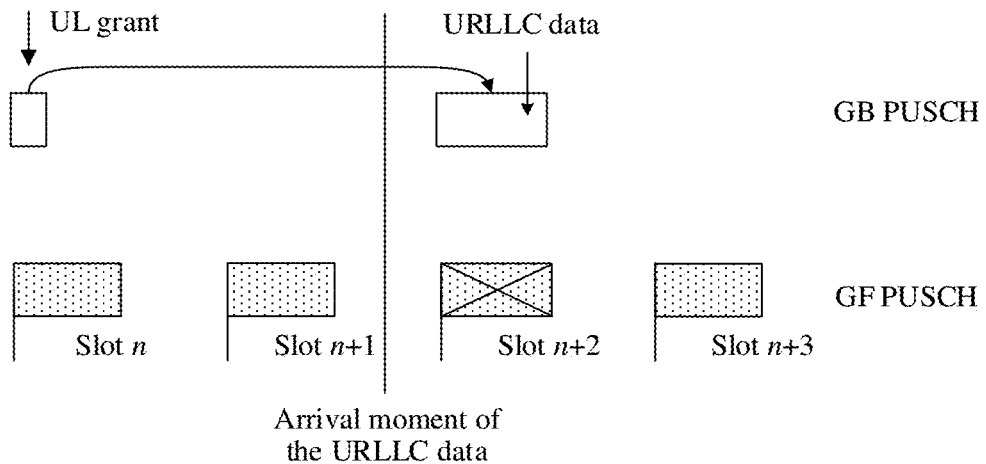
FIG. 5 is a schematic diagram of still another example of a pattern of a physical uplink channel according to this application.

FIG. 5 is a schematic diagram of still another example of a pattern of a physical uplink channel according to this application. As shown in FIG. 5, it is assumed that transmission of a GF PUSCH occupies seven symbols, a transmission periodicity of the GF PUSCH is 14 OFDM symbols, and spectral efficiency corresponding to an MCS of the GF PUSCH is SE #1. In this case, the threshold #1 may be 7.

In addition, it is assumed that the UE receives a UL grant in a slot n, and after parsing the UL grant, learns that a GB PUSCH scheduled by using the UL grant is sent in a slot n+2 and occupies symbols 0 to 7. In addition, spectral efficiency corresponding to an MCS used for the GB PUSCH is SE #2. The PHY layer entity on the UE side reports the UL grant to the MAC layer entity and notifies the MAC layer entity of transmission features of the GB PUSCH, where the transmission features include a time domain position, a time length, an MCS, a TBS, and the like.

As shown in FIG. 5, in a slot n+1, the UE needs to send URLLC data.

For example, after the URLLC data arrives, the URLLC data cannot be sent on a GF PUSCH before the GB PUSCH in time and needs to be sent on GF PUSCH resources overlapping the GB PUSCH, or there is a GF PUSCH before the GB PUSCH but the URLLC data is not completely sent, and a remaining part of the URLLC data is intended to be sent on GF PUSCH resources overlapping the GB PUSCH.

If the UE finds, at the MAC layer, that the GB PUSCH and the GF PUSCH resources overlap in time domain, more precisely, the GB PUSCH and two GF PUSCHs overlap, the MAC layer entity performs PUSCH deletion.

As shown in FIG. 5, because the time length of the GB PUSCH is seven symbols and equal to the threshold #1, the MAC layer entity directly selects the GB PUSCH to carry the URLLC data, or the MAC layer entity further determines whether the spectral efficiency (SE) #2 corresponding to the MCS of the GB PUSCH is greater than the second threshold SE #1. When the SE #2 corresponding to the MCS of the GB PUSCH is not greater than the SE #1 corresponding to the MCS of the GF PUSCH, the MAC layer entity selects the GB PUSCH to carry the data, and cancels sending of the GF PUSCH.

The UE performs, at the MAC layer, logical channel deletion and LCP processing based on a feature of the selected PUSCH, and after completing MAC PDU packet assembly, delivers an assembled packet to the PHY layer entity, and notifies the PHY layer entity that the selected PUSCH is the GB PUSCH. The PHY layer entity performs transmission of the GB PUSCH according to an instruction of the MAC layer, where the transmission includes performing scrambling, modulation and coding, layer mapping, resource mapping, and transform precoding (if the TP is required for higher-layer configuration) on the data packet delivered by the MAC layer entity, to complete uplink information transmission.

Correspondingly, because a gNB side does not learn whether the URLLC data arrives on the UE side, the gNB side needs to perform signal receiving on both the GB PUSCH and the GF PUSCH resource.

Figure 6:
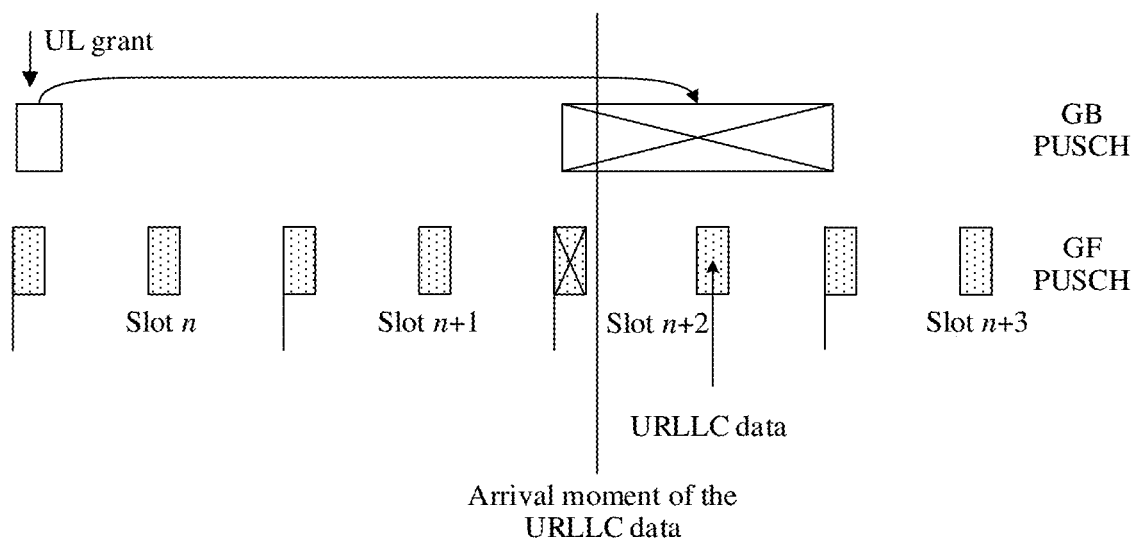
FIG. 6 is a schematic diagram of yet another example of a pattern of a physical uplink channel according to this application.

FIG. 6 is a schematic diagram of yet another example of a pattern of a physical uplink channel according to this application. As shown in FIG. 6, it is assumed that transmission of a GF PUSCH occupies two symbols, a transmission periodicity of the GF PUSCH is seven OFDM symbols, and spectral efficiency corresponding to an MCS of the GF PUSCH is SE #1. In this case, the threshold #1 may be 2.

In addition, it is assumed that the UE receives a UL grant in a slot n, and after parsing the UL grant, learns that a GB PUSCH scheduled by using the UL grant is sent in a slot n+2 and occupies symbols 0 to 13. The PHY layer entity on the UE side reports the UL grant to the MAC layer entity and notifies the MAC layer entity of transmission features of the GB PUSCH, where the transmission features include a time domain position, a time length, an MCS, a TBS, and the like.

As shown in FIG. 6, in the slot n+2, the UE starts to send the GB PUSCH, and URLLC data arrives on the UE side on the third symbol in the slot. Because packet assembly at the MAC layer is completed, the URLLC data cannot be added to the GB PUSCH for transmission, and needs to be sent on a GF PUSCH.

Currently, the UE only needs to process the GF PUSCH at the MAC layer, and performs logical channel deletion and LCP processing based on a feature of the GF PUSCH, and after completing MAC PDU packet assembly, delivers an assembled packet to the PHY layer entity, and notifies the PHY layer entity that a selected PUSCH is the GF PUSCH.

The UE finds at the PHY layer, that a nearest usable GF PUSCH resource and a GB PUSCH that is being sent overlap in time domain, and the PHY layer entity interrupts transmission of the GB PUSCH and starts transmission of the GF PUSCH, where the transmission includes performing scrambling, modulation and coding, layer mapping, resource mapping, and transform precoding (if the TP is required for higher-layer configuration) on the data packet delivered by the MAC layer entity, to complete uplink information transmission.

A corresponding gNB side needs to receive a potential GF PUSCH even after starting to receive the GB PUSCH.

In the prior art, for a problem of multiplexing a GB PUSCH and a GF PUSCH that overlap in time domain, a solution is as follows. It is stipulated that a priority of the GB PUSCH is always higher than that of the GF PUSCH, and when the GB PUSCH and the GF PUSCH overlap, the UE selects the GB PUSCH for transmission.

It is well known that the GF PUSCH is usually used for transmission of a URLLC service, and the GB PUSCH is usually used for transmission of an eMBB service. Therefore, intuitively, the GF PUSCH has a higher priority than the GB PUSCH. The preceding conclusion is reached in RAN 2 based on the following two points.

1. The gNB is smart, and therefore cannot schedule the GB PUSCH for the eMBB service to the time domain position of the GF PUSCH. Normally, the GB PUSCH and the GF PUSCH should not overlap. If the gNB schedules the GB PUSCH to the time domain position of the GF PUSCH, it indicates that the GB PUSCH is also important, for example, the GB PUSCH is also used to carry the URLLC service. In this case, the GB PUSCH should be preferentially sent.

2. The GF PUSCH transmission is autonomous behavior of the UE, and is not data transmission controlled by the gNB. Normally, data transmission controlled by the gNB is more reliable and more efficient, and therefore has a higher priority.

However, transmission features of the URLLC data, namely, configuration features of a GF PUSCH resource at the physical layer, are not fully considered in the conclusion in RAN 2. As described above, a configuration periodicity of the GF PUSCH resource may be very short, and has a minimum of two OFDM symbols. In this case, GF PUSCHs may be very dense. As shown in the FIG. 6, when the UE configures a GF PUSCH resource, eMBB data arrives at the UE. In this case, the GF PUSCH may fail to be selected to carry the eMBB data. Therefore, the UE needs to send an SR to request the gNB to schedule a PUSCH, namely, a GB PUSCH, to carry and send the eMBB data. On the other hand, because the GF PUSCHs are densely configured, the gNB cannot schedule the GB PUSCH and the GF PUSCH to non-overlapping time-domain symbols. In this case, a case in which the GB PUSCH and the GF PUSCH overlap inevitably occurs. When the case occurs, because the GB PUSCH is triggered by the eMBB data, the GB PUSCH may have a relatively large length of a time domain symbol, and does not meet a requirement of a logical channel of the URLLC service for a maximum length of a PUSCH, and consequently cannot carry the URLLC data. As a result, when the URLLC data arrives, the GF PUSCH may be originally used to carry the URLLC data. However, because the priority of the GB PUSCH is higher than that of the GF PUSCH, the UE always selects the GB PUSCH. Consequently, the URLLC data is postponed for transmission, or even postponed for a plurality of times. This is adverse to low-latency transmission of the URLLC data. Even if the length of the time domain symbol of the GB PUSCH is relatively small, and the GB PUSCH can carry the URLLC data, because the eMBB data is sent, a target block error rate (target BLER) may be relatively large. Consequently, ultra-reliable transmission of the URLLC data cannot be ensured.

In the prior art, for the problem of multiplexing a GB PUSCH and a GF PUSCH that overlap in time domain, a solution is as follows. It is stipulated that a priority of the GF PUSCH is higher than that of the GB PUSCH. A main purpose is to protect ultra-reliable low-latency transmission of the URLLC service.

However, an important problem is ignored in the foregoing solution. That is, although the GF PUSCH is configured, there may not be data to be actually sent, and the UE actually sends the GF PUSCH only when data arrives on a corresponding logical channel. In this case, if no data of the URLLC service arrives, to be specific, no data arrives on the logical channel corresponding to the GF PUSCH, selection of the GF PUSCH is adverse. The eMBB data may fail to be sent on the GF PUSCH. A parameter of configuredGrantType1Allowed configured for a logical channel corresponding to the eMBB service is usually false, and therefore, the eMBB data cannot be sent on the GF PUSCH. In addition, because GF PUSCHs may be densely configured, the eMBB data is continuously postponed, greatly affecting transmission of the eMBB data. Even though the eMBB data can be carried on the GF PUSCH, because target transmission on the GF PUSCH is transmission of the URLLC service, a TBS is relatively small, and a target BLER is very low (that is, an index of an MCS is very small). If the GF PUSCH is used to carry the eMBB data, packet segmentation at the MAC layer and transmission over-protection at the physical layer are caused. This is adverse to improving resource utilization efficiency. Even if data of the URLLC service arrives, the UE may expect to perform a GB procedure. For example, the UE sends a specific SR to notify the gNB of arrival of the URLLC data, and the gNB schedules a GB PUSCH to carry the URLLC data. To be specific, the GB PUSCH is originally specific to the URLLC data, or even if the GB PUSCH is specific to the eMBB data, the transmission features (including the time length, the MCS, and the like) may also be used to send the URLLC data and ensure ultra-reliable low-latency transmission of the URLLC data. In this case, because the GB PUSCH is scheduled by the gNB, and behavior is more controllable, the priority of the GB PUSCH is still higher than that of the GF PUSCH. A typical advantage is that A plurality of UEs may use a same GF PUSCH resource to send data because the GF PUSCH is autonomously sent by the UEs, and in this case, the gNB needs to distinguish between the UEs by using a more complex receiving algorithm (such as a belief propagation algorithm), however, the GB PUSCH is scheduled by the gNB, and therefore, the gNB can avoid the foregoing problem.

In contrast, according to the communication method in this application, a channel that is intended to be sent is determined in a grant-based physical uplink channel and a grant-free physical uplink channel depending on whether first data is intended to be sent, so that a case in which no data is intended to be sent on a selected channel can be avoided, and sending of the first data can be reliably determined. Therefore, communication flexibility can be improved, and transmission reliability of the first data can be improved.

Figure 7:
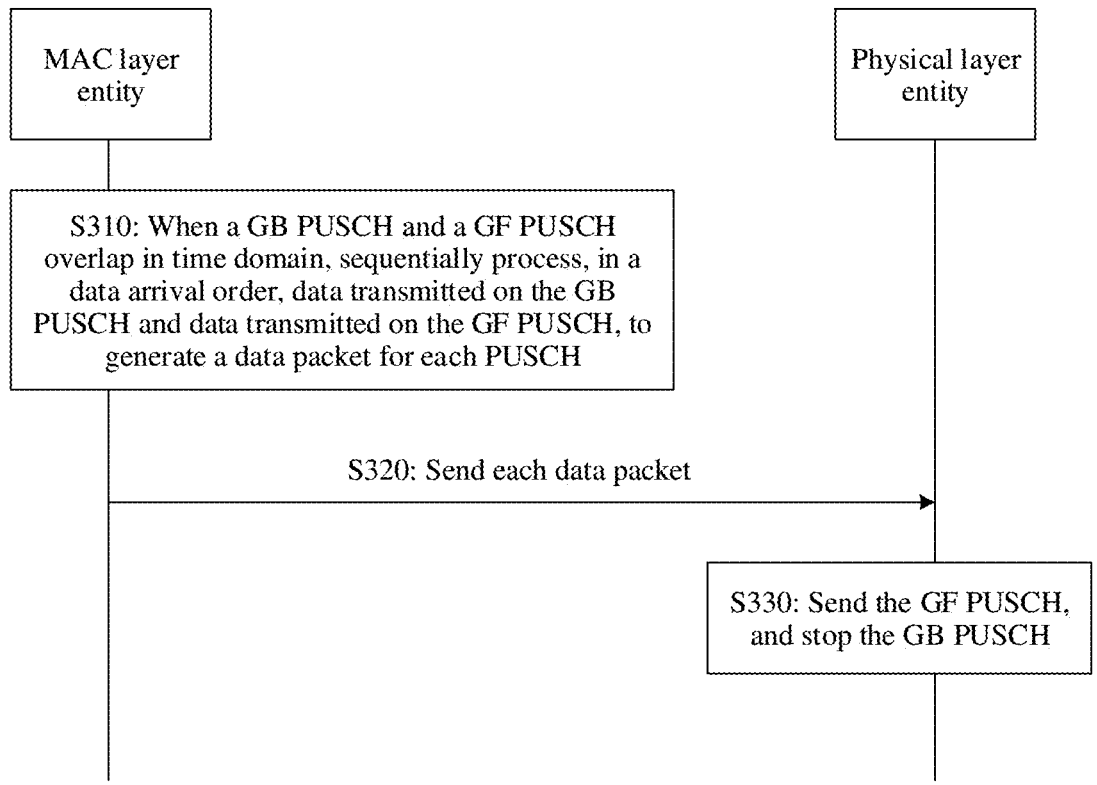
FIG. 7 is a schematic interaction diagram of another example of a communication method according to this application.

FIG. 7 is a schematic interaction diagram of another example of a communication method according to this application.

As shown in FIG. 7, in S310, a MAC layer entity of a terminal device may receive a plurality of pieces of data from a higher layer entity, where the plurality of pieces of data may include data (denoted as data #1) that is intended to be sent on a GF PUSCH and data (denoted as data #2) that is intended to be sent on a GB PUSCH.

In addition, the MAC layer entity of the terminal device may, for example, sequentially process (for example, perform LCP processing and MAC PDU packet assembly on) the plurality of pieces of data in an arrival order of the plurality of pieces of data, to generate a data packet corresponding to each piece of data.

For example, if the data #1 arrives at the MAC layer entity of the terminal device before the data #2, in other words, if the GF PUSCH has started to be sent when the data #2 arrives at the MAC layer entity of the terminal device, after completing processing of all the data that is intended to be sent on the GF PUSCH, the MAC layer entity may further process the data that is intended to be sent on the GB PUSCH.

For another example, if the data #2 arrives at the MAC layer entity of the terminal device before the data #1, in other words, if the GB PUSCH has started to be sent when the data #1 arrives at the MAC layer entity of the terminal device, after completing processing of all the data that is intended to be sent on the GB PUSCH, the MAC layer entity may further process the data that is intended to be sent on the GF PUSCH.

In S320, the MAC layer entity of the terminal device may send a plurality of generated data packets to a physical layer entity, where the plurality of data packets may include a data packet (denoted as a data packet #1) that is intended to be sent on the GF PUSCH and a data packet (denoted as a data packet #2) that is intended to be sent on the GB PUSCH.

In addition, the MAC layer entity of the terminal device may indicate, to the physical layer entity, a PUSCH on which each data packet needs to be carried.

For example, the "indicate" may be direct indication. For example, the MAC layer entity of the terminal device may indicate a correspondence between each data packet and each PUSCH to the physical layer entity.

For example, the "indicate" may be indirect indication. For example, the MAC layer entity of the terminal device may indicate a correspondence between each data packet and each PUSCH by using HARQ process IDs. In other words, the GB PUSCH and the GF PUSCH that the UE needs to process have different hybrid automatic repeat request (Hybrid Automatic Repeat Request, HARQ) identifications (Identification, ID), and this process may be implemented based on scheduling of a gNB. Then, each HARQ entity (entity) has an ID of the HARQ entity, and delivers a data packet to the PHY layer entity. When receiving a data packet from a HARQ entity, the PHY layer entity learns of an ID of the HARQ entity, and indirectly learns of a PUSCH corresponding to the data packet.

In S330, the physical layer entity of the terminal device may preferentially send the data packet #1. In other words, the physical layer entity of the terminal device may send the GF PUSCH, and stop or cancel sending of the GB PUSCH.

For example, the terminal device may discard the data packet #2.

Alternatively, the terminal device may store the data packet #2 in a buffer apparatus. In addition, after sending of the GF PUSCH is completed, if a network device schedules a GB PUSCH again, indicates a same HARQ process number, and instructs to perform retransmission, the terminal device may send the data packet #2 on the newly scheduled GB PUSCH.

According to the prior art, if a grant-based physical uplink channel and a grant-free physical uplink channel overlap, processing of data that is intended to be sent on the grant-free physical uplink channel is stopped at a MAC layer, affecting transmission of the data. In contrast, in this application, if the grant-based physical uplink channel and the grant-free physical uplink channel overlap, each piece of data is processed at the MAC layer in the arrival order, and the second physical uplink channel is first sent at a physical layer, so that after sending of the second physical uplink channel is completed, the first physical uplink channel is immediately sent, thereby improving communication efficiency.

Figure 8:
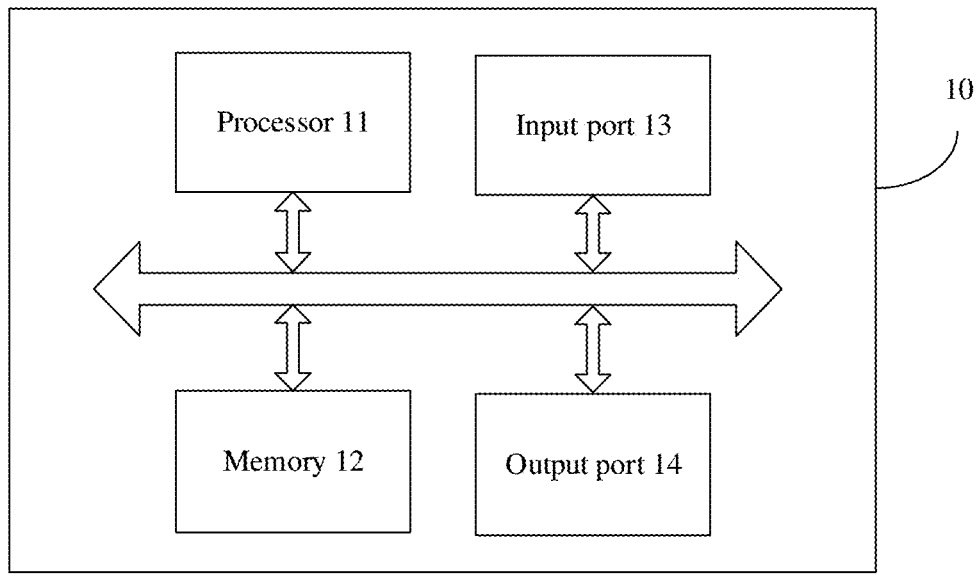
FIG. 8 is a schematic block diagram of an example of a communications apparatus according to this application.

According to the foregoing methods, FIG. 8 is a first schematic diagram of a communications apparatus 10 according to an embodiment of this application. As shown in FIG. 8, the communications apparatus 10 may be a terminal device, or may be a chip or a circuit, for example, a chip or a circuit that may be disposed in a terminal device.

The communications apparatus 10 may include a processor 11 (namely, an example of a processing unit) and a memory 12. The memory 12 is configured to store an instruction. The processor 11 is configured to execute the instruction stored in the memory 12, so that the apparatus 20 implements the steps performed by the terminal device (for example, the UE) in the corresponding method shown in FIG. 2.

Further, the communications apparatus 10 may further include an input port 13 (namely, an example of a communications unit) and an output port 14 (namely, another example of the communications unit). Further, the processor 11, the memory 12, the input port 13, and the output port 14 may communicate with each other through an internal connection path, to transmit a control signal and/or a data signal. The memory 12 is configured to store a computer program. The processor 11 may be configured to invoke the computer program from the memory 12 and run the computer program, to control the input port 13 to receive a signal, and control the output port 14 to send a signal, to complete the steps performed by the terminal device in the foregoing methods. The memory 12 may be integrated into the processor 11, or may be separated from the processor 11.

Optionally, if the communications apparatus 10 is a terminal device, the input port 13 is a receiver, and the output port 14 is a transmitter. The receiver and the transmitter may be a same physical entity or different physical entities. If being a same physical entity, the receiver and the transmitter may be collectively referred to as a transceiver.

Optionally, if the communications apparatus 10 is a chip or a circuit, the input port 13 is an input interface and the output port 14 is an output interface.

In an implementation, it may be considered that functions of the input port 13 and the output port 14 are implemented through a transceiver circuit or a chip dedicated for transceiving. It may be considered that the processor 11 is implemented through a dedicated processing chip, a processing circuit, a processor, or a general-purpose chip.

In another implementation, it may be considered to implement the terminal device provided in the embodiments of this application by using a general-purpose computer. To be specific, program code that is used to implement functions of the processor 11, the input port 13, and the output port 14 is stored in the memory 12, and a general-purpose processor implements the functions of the processor 11, the input port 13, and the output port 14 by executing the code in the memory 12.

In this embodiment of this application, the processor 11 is configured to determine a first determining result when a first physical uplink channel and a second physical uplink channel overlap in time domain, where the first determining result includes a determining result about whether first data is intended to be sent, the first physical uplink channel includes a dynamic grant physical uplink channel, the second physical uplink channel includes a configured grant physical uplink channel, and the first logical channel corresponds to the second physical uplink channel, and determine, in the first physical uplink channel and the second physical uplink channel based on the first determining result, a target physical uplink channel that is intended to be sent. The output port 14 is configured to send the target physical uplink channel.

Optionally, the processor 11 is specifically configured to determine the target physical uplink channel in the first physical uplink channel and the second physical uplink channel based on the first determining result and a second determining result, where the second determining result includes a determining result about whether logical channel prioritization LCP processing has been started for the first physical uplink channel at a media access control (MAC) layer, or the second determining result includes a determining result about whether packet assembly into a MAC layer packet data unit PDU corresponding to the first physical uplink channel has been started at a MAC layer, or the second determining result includes a determining result about whether packet assembly into a MAC PDU corresponding to the first physical uplink channel has been completed, or the second determining result includes a determining result about whether the first physical uplink channel has started to be sent at a physical layer.

Optionally, the processor 11 is specifically configured to if the first determining result is yes, and the second determining result is yes, use the second physical uplink channel as the target physical uplink channel, or if the first determining result is yes, and the second determining result is no, use either the first physical uplink channel or the second physical uplink channel as the target physical uplink channel.

Optionally, the processor 11 is specifically configured to determine the target physical uplink channel in the first physical uplink channel and the second physical uplink channel based on the first determining result and a time length of the first physical uplink channel.

Optionally, the processor 11 is specifically configured to if the first determining result is yes, and the time length of the first physical uplink channel is less than or equal to a first threshold, determine the first physical uplink channel as the target physical uplink channel, or if the first determining result is yes, and the time length of the first physical uplink channel is greater than a first threshold, determine the second physical uplink channel as the target physical uplink channel.

Optionally, the processor 11 is specifically configured to determine the target physical uplink channel in the first physical uplink channel and the second physical uplink channel based on the first determining result, a time length of the first physical uplink channel, and a modulation and coding scheme (MCS) of the first physical uplink channel.

Optionally, the processor 11 is specifically configured to if the first determining result is yes, the time length of the first physical uplink channel is less than or equal to the first threshold, and spectral efficiency (SE) corresponding to the MCS of the first physical uplink channel is less than or equal to a second threshold, determine the first physical uplink channel as the target physical uplink channel, or if the first determining result is yes, the time length of the first physical uplink channel is less than or equal to the first threshold, and spectral efficiency (SE) corresponding to the MCS of the first physical uplink channel is greater than a second threshold, determine the second physical uplink channel as the target physical uplink channel.

Optionally, the processor 11 is specifically configured to if the first determining result is no, use the first physical uplink channel as the target physical uplink channel, or if the first determining result is yes, determine the second physical uplink channel as the target physical uplink channel.

The foregoing listed functions and actions of the modules or units in the communications apparatus 10 are merely examples for description. The modules or units in the communications apparatus 10 may be configured to perform actions or processing processes performed by the terminal device in the foregoing methods. To avoid repetition, detailed descriptions are omitted herein.

For concepts, explanations, detailed descriptions, and other steps of the apparatus 10 that are related to the technical solutions provided in the embodiments of this application, refer to the descriptions of the content in the foregoing methods or other embodiments. Details are not described herein again.

Figure 9:
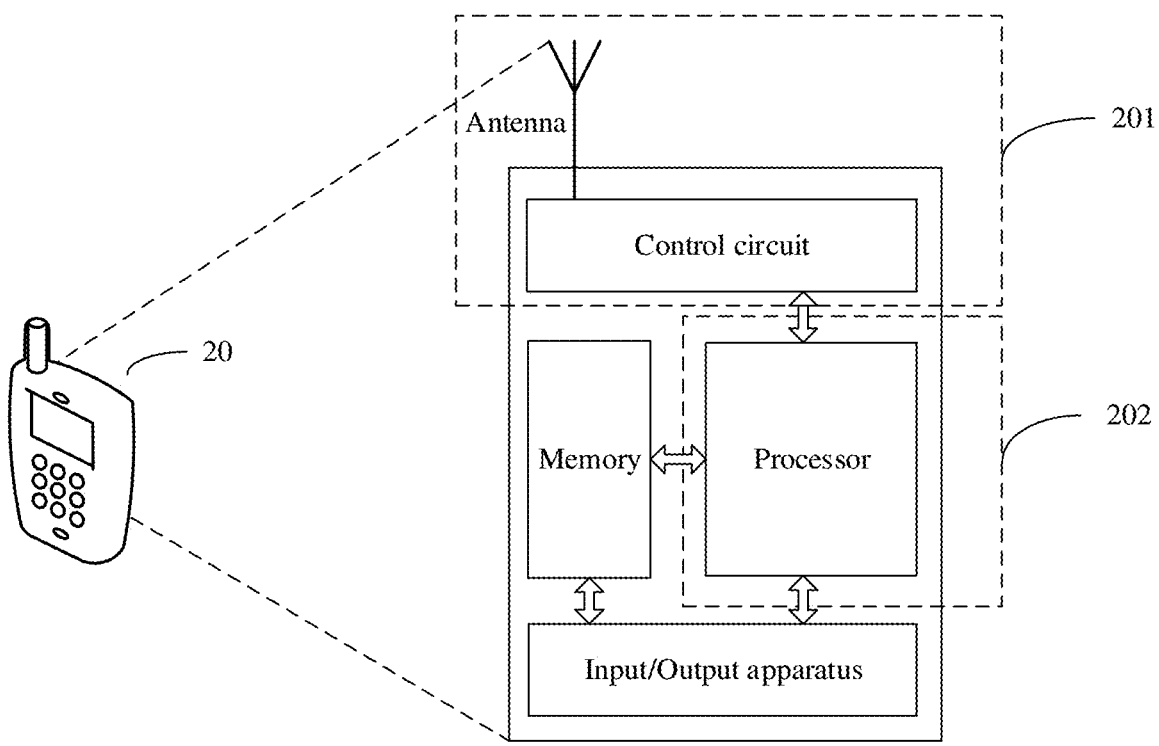
FIG. 9 is a schematic block diagram of another example of a terminal device according to this application.

FIG. 9 is a schematic structural diagram of a terminal device 20 according to this application. For ease of description, FIG. 9 shows only main components of the terminal device. As shown in FIG. 9, the terminal device 20 includes a processor, a memory, a control circuit, an antenna, and an input/output apparatus.

The processor is mainly configured to process a communications protocol and communications data, control the entire terminal device, execute a software program, and process data of the software program, for example, is configured to support the terminal device in performing the actions described in the foregoing embodiments of the foregoing method. The memory is mainly configured to store the software program and the data, for example, store the codebook described in the foregoing embodiments. The control circuit is mainly configured to perform conversion between a baseband signal and a radio frequency signal, and process the radio frequency signal. A combination of the control circuit and the antenna may also be referred to as a transceiver that is mainly configured to send and receive a radio frequency signal in a form of an electromagnetic wave. The input/output apparatus such as a touchscreen, a display screen, or a keyboard is mainly configured to receive data entered by a user and output data to the user.

After the terminal device is powered on, the processor may read the software program in the memory, explain and execute an instruction of the software program, and process the data of the software program. When data is intended to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal through the antenna in a form of an electromagnetic wave. When data is sent to the terminal device, the radio frequency circuit receives a radio frequency signal through the antenna, converts the radio frequency signal into a baseband signal, and outputs the baseband signal to the processor, and the processor converts the baseband signal into data, and processes the data.

Figure 11:
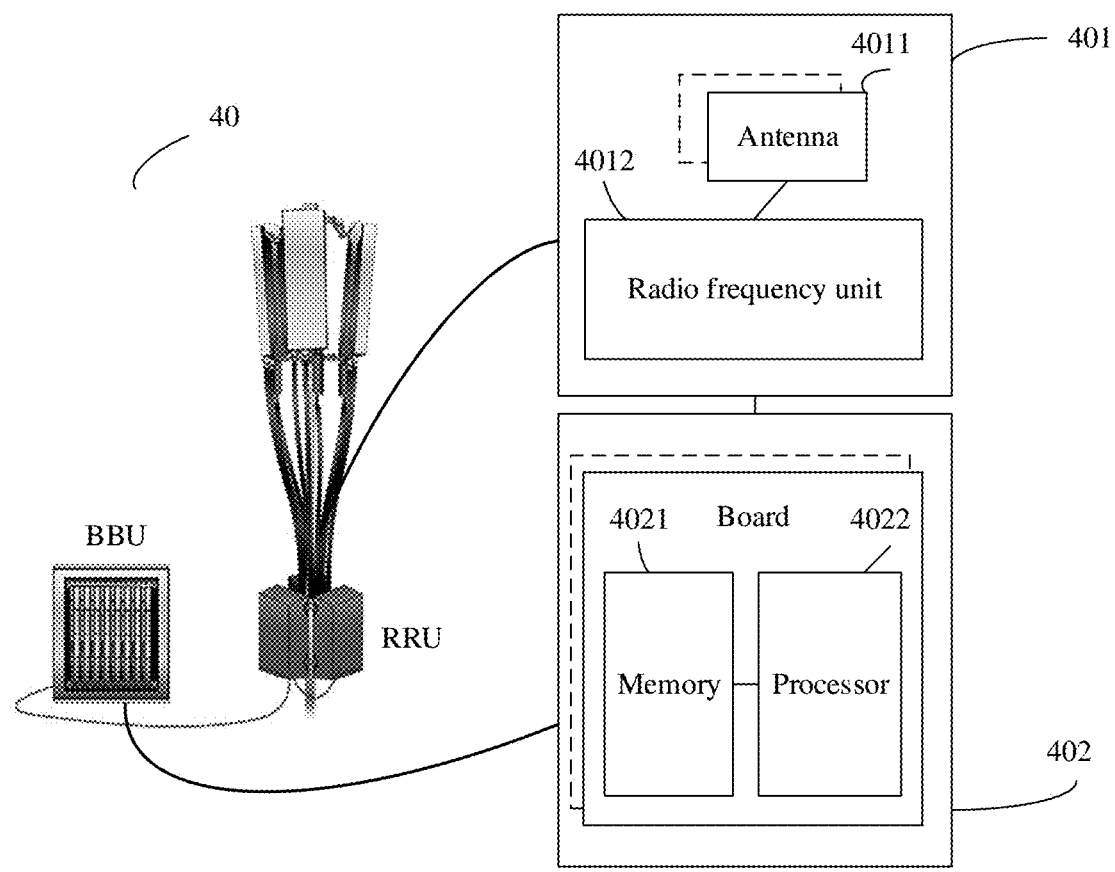
FIG. 11 is a schematic block diagram of an example of a network device according to this application.

A person skilled in the art may understand that, for ease of description, FIG. 11 shows only one memory and only one processor. An actual terminal device may have a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communications protocol and the communications data. The central processing unit is mainly configured to control the entire terminal device, execute the software program, and process the data of the software program. The processor in FIG. 11 is integrated with functions of the baseband processor and the central processing unit. A person skilled in the art may understand that, the baseband processor and the central processing unit may be independent processors, and are interconnected through a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected through various buses. The baseband processor may also be expressed as a baseband processing circuit or a baseband processing chip. The central processing unit may also be expressed as a central processing circuit or a central processing chip. The function of processing the communications protocol and the communications data may be built in the processor, or may be stored in the memory in a form of a software program, and the processor executes the software program to implement a baseband processing function.

For example, in this embodiment of this application, the antenna having a transceiver function and the control circuit may be considered as a transceiver unit 201 of the terminal device 20, and the processor having a processing function may be considered as a processing unit 202 of the terminal device 20. As shown in FIG. 1i, the terminal device 20 includes the transceiver unit 201 and the processing unit 202. The transceiver unit may also be referred to as a transceiver, a transceiver apparatus, or the like. Optionally, a component that is in the transceiver unit 201 and that is configured to implement a receiving function may be considered as a receiving unit, and a component that is in the transceiver unit 201 and that is configured to implement a sending function may be considered as a sending unit. In other words, the transceiver unit 201 includes the receiving unit and the sending unit. For example, the receiving unit may also be referred to as a receiver, a receiver, a receive circuit, or the like, and the sending unit may be referred to as a transmitter, a transmit circuit, or the like.

Figure 10:
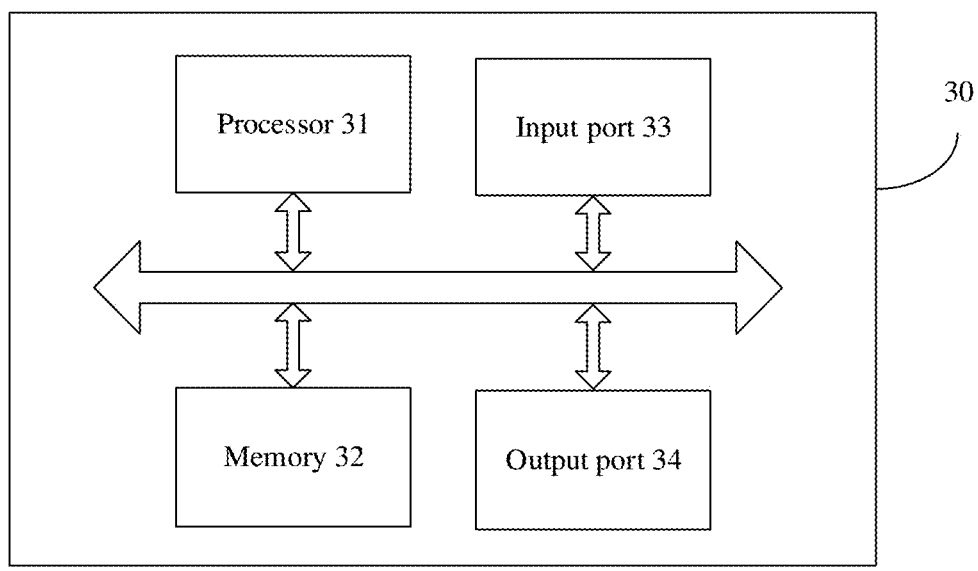
FIG. 10 is a schematic block diagram of an example of a communications apparatus according to this application.

According to the foregoing methods, FIG. 10 is a second schematic diagram of a communications apparatus 30 according to an embodiment of this application. As shown in FIG. 10, the apparatus 30 may be a network device (for example, the foregoing gNB), or may be a chip or a circuit, for example, a chip or a circuit that may be disposed in a network device.

The apparatus 30 may include a processor 31 (namely, an example of a processing unit) and a memory 32. The memory 32 is configured to store an instruction, and the processor 31 is configured to execute the instruction stored in the memory 32, so that the apparatus 30 implements the steps performed by the network device in the foregoing methods.

Further, the apparatus 30 may further include an input port 33 (namely, an example of a communications unit) and an output port 34 (namely, another example of the communications unit).

Further, the processor 31, the memory 32, the input port 33, and the output port 34 may communicate with each other through an internal connection path, to transmit a control signal and/or a data signal.

In another implementation, it may be considered to implement the network device provided in the embodiments of this application by using a general-purpose computer. To be specific, program code that is used to implement functions of the processor 31, the input port 33, and the output port 34 is stored in the memory, and a general-purpose processor implements the functions of the processor 31, the input port 33, and the output port 34 by executing the code in the memory 32.

The memory 32 is configured to store a computer program. The processor 31 may be configured to invoke the computer program from the memory 32 and run the computer program, to detect both a GB PUSCH and a GF PUSCH when the GB PUSCH and the GF PUSCH overlap in time domain.

The foregoing listed functions and actions of the modules or units in the communications apparatus 30 are merely examples for description. The modules or units in the communications apparatus 30 may be configured to perform actions or processing processes performed by the network device (for example, the gNB #A) in the foregoing methods. To avoid repetition, detailed descriptions are omitted herein.

For concepts, explanations, detailed descriptions, and other steps of the apparatus 30 that are related to the technical solutions provided in the embodiments of this application, refer to the descriptions of the content in the foregoing methods or other embodiments. Details are not described herein again.

FIG. 11 is a schematic structural diagram of a network device 40 according to an embodiment of this application. The network device 40 may be configured to implement the functions of the network device (for example, an access network device or a core network device) in the foregoing methods. The network device 40 includes one or more radio frequency units such as a remote radio unit (remote radio unit, RRU) 401 and one or more baseband units (baseband unit, BBU) (which may also be referred to as digital units, DUs) 402. The RRU 401 may be referred to as a transceiver unit, a transceiver, a transceiver circuit, or the like, and may include at least one antenna 4011 and a radio frequency unit 4012. The RRU 401 is mainly configured to send and receive a radio frequency signal, and perform conversion between a radio frequency signal and a baseband signal, for example, configured to send the signaling message in the foregoing embodiments to a terminal device. The BBU 402 is mainly configured to perform baseband processing, control a base station, and so on. The RRU 401 and the BBU 402 may be physically disposed together, or may be physically separate, to be specific, in a distributed base station.

The BBU 402 is a control center of the base station, may also be referred to as a processing unit, and is mainly configured to implement a baseband processing function, for example, channel coding, multiplexing, modulation, and spreading. For example, the BBU (the processing unit) 402 may be configured to control the base station 40 to perform the operation procedure related to the network device in the foregoing method embodiments.

In an example, the BBU 402 may include one or more boards, and a plurality of boards may jointly support a radio access network (such as an LTE system or a 5G system) of a single access standard, or may separately support radio access networks of different access standards. The BBU 402 further includes a memory 4021 and a processor 4022. The memory 4021 is configured to store a necessary instruction and necessary data. For example, the memory 4021 stores the codebook and the like in the foregoing embodiments. The processor 4022 is configured to control the base station to perform a necessary action, for example, control the base station to perform the operation procedure related to the network device in the foregoing method embodiments. The memory 4021 and the processor 4022 may serve the one or more boards. In other words, a memory and a processor may be disposed on each board. Alternatively, a plurality of boards may share a same memory and a same processor. In addition, a necessary circuit may further be disposed on each board.

In a possible implementation, with development of a system-on-chip (System-on-chip, SoC) technology, all or some functions of the BBU 402 and the RRU 401 may be implemented through the SoC technology, for example, implemented through a base station function chip. The base station function chip integrates components such as a processor, a memory, and an antenna port. A program of a base station-related function is stored in the memory. The processor executes the program to implement the base station-related function. Optionally, the base station function chip can also read a memory outside the chip to implement the base station-related function.

It should be understood that the structure of the network device shown in FIG. 11 is merely a possible form, and should not constitute any limitation on the embodiments of this application. In this application, there may be a base station structure in another form in the future.

According to the methods provided in the embodiments of this application, an embodiment of this application further provides a communications system, including the foregoing network device and one or more terminal devices.

It should be understood that, the processor in the embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logical device, a discrete gate or a transistor logical device, a discrete hardware component, or the like. The general-purpose processor may be a microprocessor, or the processor may be any conventional processor or the like.

It should further be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example but not limitative description, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The communications system in this application may include one or more terminal devices 20 shown in FIG. 9 and one or more network devices 40 shown in FIG. 11.

In addition, the communications system in this application may further include a device other than the terminal device 20 and the network device 40.

All or some of the foregoing embodiments may be implemented by software, hardware, firmware, or any combination thereof. When the foregoing embodiments are implemented by software, the embodiments may be implemented completely or partially in a form of a computer program product. The computer program product includes one or more computer instructions or computer programs. When the computer instructions or the computer programs are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. A person skilled in the art may clearly understand that, for the purpose of convenient and brief description, for a detailed working process of the foregoing system, apparatus, and unit, refer to a corresponding process in the foregoing method embodiments, and details are not described herein again. In the several embodiments provided in this application, it should be understood that the disclosed system, apparatus, and method may be implemented in other manners. For example, the apparatus embodiments described above are merely examples. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented via some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. In addition, functional units in the embodiments of this application may be integrated into one processing unit, or each of the units may exist alone physically, or two or more units may be integrated into one unit. When the functions are implemented in a form of a software functional unit and sold or used as an independent product, the functions may be stored in a computer-readable storage medium. Based on such an understanding, the technical solutions of this application essentially, or the part contributing to the prior aft, or some of the technical solutions may be implemented in a form of a software product. The computer software product is stored in a storage medium, and includes several instructions for indicating a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining a first determining result in response to a first physical uplink channel and a second physical uplink channel overlapping in a time domain, wherein the first determining result comprises a determining result associated with whether first data is intended to be sent, wherein the first physical uplink channel comprises a dynamic grant physical uplink channel, and wherein the second physical uplink channel comprises a configured grant physical uplink channel; and
   determining, in the first physical uplink channel and the second physical uplink channel according to the first determining result, and further according to an arrival time of the first data in relation to transmission scheduling of resources of the first physical uplink channel and the second physical uplink channel, a target physical uplink channel on which the first data will be sent.

2. The communication method according to claim 1, wherein the determining the target physical uplink channel comprises:
   determining the target physical uplink channel in the first physical uplink channel and the second physical uplink channel according to the first determining result and a second determining result
   wherein the second determining result comprises at least one of: a determining result associated with whether logical channel prioritization (LCP) processing has been started for the first physical uplink channel at a media access control (MAC) layer, a determining result associated with whether packet assembly into a MAC layer packet data unit (PDU) corresponding to the first physical uplink channel has been started at a MAC layer, a determining result associated with whether packet assembly into a MAC PDU corresponding to the first physical uplink channel has been completed, a determining result associated with whether the first physical uplink channel has started to be sent on a physical (PHY) layer, or a determining result associated with whether a time interval between a moment of obtaining the first determining result and a start moment of the first physical uplink channel is less than a preset time threshold.

3. The communication method according to claim 2, wherein the determining the target physical uplink channel comprises:
   using the second physical uplink channel as the target physical uplink channel in response to the first determining result being yes, and further in response to the second determining result being yes; and
   performing, in response to the first determining result being yes, and further in response to the second determining result being no, at least one of:
      using at least one of the first physical uplink channel or the second physical uplink channel as the target physical uplink channel;
      determining the target physical uplink channel in the first physical uplink channel and the second physical uplink channel according to a time length of the first physical uplink channel; or
      determining the target physical uplink channel in the first physical uplink channel and the second physical uplink channel according to a time length of the first physical uplink channel and a modulation and coding scheme (MCS) of the first physical uplink channel; or
      determining the target physical uplink channel in the first physical uplink channel and the second physical uplink channel according to a time length of the first physical uplink channel, an MCS of the first physical uplink channel, and a transport block size (TBS) of the first physical uplink channel.

4. The communication method according to claim 1, wherein the determining the target physical uplink channel that is intended to be sent comprises:
   determining the target physical uplink channel in the first physical uplink channel and the second physical uplink channel according to the first determining result and a time length of the first physical uplink channel.

5. The communication method according to claim 4, wherein the determining the target physical uplink channel comprises:
   determining the first physical uplink channel as the target physical uplink channel in response to the first determining result being yes, and further in response to the time length of the first physical uplink channel being less than or equal to a first threshold; and
   determining the second physical uplink channel as the target physical uplink channel in response to the first determining result being yes, and further in response to the time length of the first physical uplink channel being greater than the first threshold.

6. The communication method according to claim 5, wherein the first threshold is determined according to a time length of the second physical uplink channel.

7. The communication method according to claim 6, wherein the first threshold is the same as a value of the time length of the second physical uplink channel.

8. The communication method according to claim 1, wherein the determining a target physical uplink channel that is intended to be sent comprises:
   determining the first physical uplink channel as the target physical uplink channel in response to the first determining result being no; or
   determining the second physical uplink channel as the target physical uplink channel in response to the first determining result being yes.

9. The communication method according to claim 1, further comprising:
stopping sending of a non-target physical uplink channel, wherein the non-target physical uplink channel is one of the first physical uplink channel or the second physical uplink channel that is not determined as the target physical uplink channel.

10. The communication method according to claim 1, wherein the first data comprises at least one of ultra-reliable low-latency communication (URLLC) data, data that meets a preset quality of service requirement and that is in a higher layer data flow arriving at a media access control (MAC) layer, or data on a first logical channel; and
wherein the first logical channel comprises one of a logical channel used to send the URLLC data, a logical channel indicated by a network device by using higher layer signaling, a logical channel predefined in a communications protocol, a logical channel whose parameter of configured Grant Type 1 Allowed is present, or a logical channel whose parameter of configuredGrantType1Allowed is set to 1.

11. A communications apparatus, comprising:
a processor; and
a non-transitory computer readable medium storing a program for execution by the processor, the program having instructions for:
determining a first determining result in response to a first physical uplink channel and a second physical uplink channel overlapping in a time domain, wherein the first determining result comprises a determining result associated with whether first data is intended to be sent, wherein the first physical uplink channel comprises a dynamic grant physical uplink channel, and wherein the second physical uplink channel comprises a configured grant physical uplink channel; and
determining, in the first physical uplink channel and the second physical uplink channel according to the first determining result, and further according to an arrival time of the first data in relation to transmission scheduling of resources of the first physical uplink channel and the second physical uplink channel, a target physical uplink channel on which the first data will be sent.

12. The apparatus according to claim 11, wherein the instructions for determining a target physical uplink channel include instructions for
determining the target physical uplink channel in the first physical uplink channel and the second physical uplink channel according to the first determining result and a second determining result; and
wherein the second determining result comprises at least one of a determining result associated with whether logical channel prioritization (LCP) processing has been started for the first physical uplink channel at a media access control (MAC) layer, a determining result associated with whether packet assembly into a MAC layer packet data unit (PDU) corresponding to the first physical uplink channel has been started at a MAC layer, a determining result associated with whether packet assembly into a MAC PDU corresponding to the first physical uplink channel has been completed, a determining result associated with whether the first physical uplink channel has started to be sent on a physical (PHY) layer or a determining result associated with whether a time interval between a moment of obtaining the first determining result and a start moment of the first physical uplink channel is less than a preset time threshold.

13. The apparatus according to claim 12, wherein the instructions for determining the target physical uplink channel include instructions for:
using the second physical uplink channel as the target physical uplink channel in response to the first determining result being yes, and further in response to the second determining result being yes; and
performing, in response to the first determining result being yes, and further in response to the second determining result being no, at least one of:
using either the first physical uplink channel or the second physical uplink channel as the target physical uplink channel; determining the target physical uplink channel in the first physical uplink channel and the second physical uplink channel according to a time length of the first physical uplink channel; determining the target physical uplink channel in the first physical uplink channel and the second physical uplink channel according to the time length of the first physical uplink channel and a modulation and coding scheme (MCS) of the first physical uplink channel; or
determining the target physical uplink channel in the first physical uplink channel and the second physical uplink channel according to the time length of the first physical uplink channel, an MCS of the first physical uplink channel, and a transport block size (TBS) of the first physical uplink channel.

14. The apparatus according to claim 11, wherein the instructions for determining a target physical uplink channel include instructions for:
determining the target physical uplink channel in the first physical uplink channel and the second physical uplink channel according to the first determining result and a time length of the first physical uplink channel.

15. The apparatus according to claim 14, wherein the instructions for determining the target physical uplink channel include instructions for:
determining the first physical uplink channel as the target physical uplink channel, in response to the first determining result being yes, and further in response to the time length of the first physical uplink channel being less than or equal to a first threshold; and
determining the second physical uplink channel as the target physical uplink channel in response to the first determining result being yes, and further in response to the time length of the first physical uplink channel being greater than the first threshold.

16. The apparatus according to claim 15, wherein the first threshold is determined according to a time length of the second physical uplink channel.

17. The apparatus according to claim 16, wherein the first threshold is the same as a value of the time length of the second physical uplink channel.

18. The apparatus according to claim 11, wherein the instructions for determining a target physical uplink channel include instructions for:
determining the first physical uplink channel as the target physical uplink channel in response to if the first determining result being no; and
determining the second physical uplink channel as the target physical uplink channel in response to the first determining result being yes.

19. The apparatus according to claim 11, wherein the program further includes instructions for:

stopping sending of a non-target physical uplink channel, wherein the non-target physical uplink channel is one of the first physical uplink channel and the second physical uplink channel that is not determined as the target physical uplink channel.

20. The apparatus according to claim 11, wherein the first data comprises at least one of ultra-reliable low-latency communication (URLLC) data, data that meets a preset quality of service requirement and that is in a higher layer data flow arriving at a media access control (MAC) layer, or data on a first logical channel; and wherein the first logical channel comprises at least one of a logical channel used to send the URLLC data, a logical channel indicated by a network device by using higher layer signaling, a logical channel predefined in a communications protocol, a logical channel whose parameter of configured Grant Type 1 Allowed is present, or a logical channel whose parameter of configuredGrantType1Allowed is set to 1.

* * * * *